(12) United States Patent
Abdel-Aziz et al.

(10) Patent No.: US 8,112,801 B2
(45) Date of Patent: Feb. 7, 2012

(54) METHOD AND APPARATUS FOR DETECTING MALWARE

(75) Inventors: Bassem Abdel-Aziz, Kanata (CA);
Stanley Taihai Chow, Ottawa (CA);
Shu-Lin Chen, Kanata (CA)

(73) Assignee: Alcatel Lucent, Paris (FR)

( * ) Notice: Subject to any disclaimer, the term of this patent is extended or adjusted under 35 U.S.C. 154(b) by 622 days.

(21) Appl. No.: 12/248,537

(22) Filed: Oct. 9, 2008

(65) Prior Publication Data

US 2009/0044276 A1 Feb. 12, 2009

Related U.S. Application Data

(63) Continuation-in-part of application No. 12/145,768, filed on Jun. 25, 2008, and a continuation-in-part of application No. 11/802,965, filed on May 29, 2007, now Pat. No. 7,917,957, and a continuation-in-part of application No. 11/785,655, filed on Apr. 19, 2007, and a continuation-in-part of application No. 11/656,434, filed on Jan. 23, 2007.

(51) Int. Cl.
*G06F 12/14* (2006.01)
*H04L 9/32* (2006.01)

(52) U.S. Cl. .............. 726/22; 726/23; 726/24; 726/25; 713/160; 713/188

(58) Field of Classification Search .............. 726/22–25; 713/160, 188
See application file for complete search history.

(56) References Cited

U.S. PATENT DOCUMENTS

| 7,376,842 | B1 * | 5/2008 | Hursey ...................... 713/188 |
| 7,779,472 | B1 * | 8/2010 | Lou .................................. 726/24 |
| 7,788,699 | B2 * | 8/2010 | Largman et al. ................... 726/1 |
| 7,936,682 | B2 | 5/2011 | Singh et al. |
| 2004/0054925 | A1 * | 3/2004 | Etheridge et al. ............. 713/201 |

(Continued)

FOREIGN PATENT DOCUMENTS

WO 2006/081507 A1 8/2006

(Continued)

OTHER PUBLICATIONS

Jiang et al., "An Improved Real-Time Traffic Flow Monitoring Scheme", Department of Electrical Engineering, National University of Singapore, Singapore, 5 pages.

(Continued)

*Primary Examiner* — Krisna Lim
(74) *Attorney, Agent, or Firm* — Fay Sharpe LLP

(57) ABSTRACT

A method of detecting malware may include: a) examining header data in each PDU transferred by a port of an access switch to identify PDUs transferred from a local network device, b) extracting a far-end device address for PDUs based at least in part on examination of an address portion of the corresponding header data, c) maintaining fan-out information indicative of a quantity of unique far-end device addresses extracted from the PDUs during consecutive time windows, d) determining a current trend based on the fan-out information for a current time window, e) comparing the current trend to an expected trend, and f) identifying a suspected malware infection in the local network device when the current trend exceeds the expected trend by a trend threshold. A network element that may implement the method may include a header data processing unit, data storage logic, data processing logic, and malware identification logic.

20 Claims, 13 Drawing Sheets

U.S. PATENT DOCUMENTS

| | | | |
|---|---|---|---|
| 2004/0187023 A1 | 9/2004 | Alagna et al. | |
| 2004/0250114 A1 | 12/2004 | Parekh et al. | |
| 2006/0224724 A1* | 10/2006 | Marinescu et al. | 709/224 |
| 2006/0242709 A1* | 10/2006 | Seinfeld et al. | 726/24 |
| 2006/0259967 A1* | 11/2006 | Thomas et al. | 726/22 |
| 2007/0006304 A1* | 1/2007 | Kramer et al. | 726/22 |
| 2007/0011741 A1 | 1/2007 | Robert et al. | |
| 2007/0067845 A1 | 3/2007 | Wiemer et al. | |
| 2007/0067847 A1 | 3/2007 | Wiemer et al. | |
| 2007/0067848 A1 | 3/2007 | Gustave et al. | |
| 2007/0101430 A1* | 5/2007 | Raikar | 726/24 |
| 2007/0162975 A1* | 7/2007 | Overton et al. | 726/24 |
| 2007/0286085 A1 | 12/2007 | Rabinovitch | |
| 2008/0005797 A1* | 1/2008 | Field et al. | 726/24 |
| 2008/0056487 A1* | 3/2008 | Akyol et al. | 380/2 |
| 2008/0115215 A1* | 5/2008 | Bardsley | 726/24 |
| 2009/0038011 A1* | 2/2009 | Nadathur | 726/24 |
| 2009/0282476 A1* | 11/2009 | Nachenberg et al. | 726/22 |

FOREIGN PATENT DOCUMENTS

WO          2006/103337 A1    10/2006

OTHER PUBLICATIONS

Mirkovic, "D-WARD: Source-End Defense Against Distributed Denial-of-Service Attacks", University of California, A dissertation submitted in partial satisfaction of the requirements for the degree Doctor of Philosophy in Computer Science, 2003, pp. i-xx, 92-142 (Chap. 6), and 179-265 (Chap. 9).

Whang et al., A Linear-Time Probabilistic Counting Algorithm for Database Applcations, ACM Transactions on Database Systems, vol. 15, No. 2, Jun. 1990, pp. 208-229.

Bibliographic Data for PCT App. No. PCT/FR2006/000631 with Abstract in English where WO 2006/103337 is in French, printed from WIPO website (www.wipo.int) on Mar. 2, 2009, 2 pages.

Zou et al., "The monitoring and early detection of internet worms", IEEE/ACM Transactions on Networking, vol. 13, Issue 5, Oct. 2005, pp. 961-974.

Ruoming Pang, Mark Allman, Mike Bennett, Jason Lee, Vern Paxson, and Brian Tierney, "A First Look at Modern Enterprise Traffic", Princeton University, International Computer Science Institute, Lawrence Berkeley National Laboratory, Internet Measurement Conference 2005.

Jaeyeon Jung, Vern Paxson, Arthur W. Berger, and Hari Balakrishnan, "Fast Portscan Detection Using Sequential Hypothesis Testing", MIT Computer Science and Artificial Intelligence Laboratory, Cambridge, MA, USA, ICSI Center for Internet Research, and Lawrence Berkeley National Laboratory, Berkeley, CA, USA.

David Whyte, Evangelos Kranakis, and P.C. Van Oorschot, "DNS-Based Detection of Scanning Worms in an Enterprise Network", School of Computer Science, Carleton University, Ottawa, Ontario, Canada.

Stuart E. Schechter, Jaeyeon Jung, and Arthur W. Berger, "Fast Detection of Scanning Worm Infections", Harvard DEAS, Cambridge, MA, MIT CSAIL, Cambridge, MA.

Shobha Venkataraman, Dawn Song, Phillip B. Gibbons, and Avrim Blum, New Streaming Algorithms for Fast Detection of Superspreaders, Carnegie Mellon University, Intel Research Pittsburg.

David Whyte, P.C. Van Oorschot, and Evangelos Kranakis, "ARP-Based Detection of Scanning Worms Within an Enterprise Network", School of Computer Science, Carleton University, Ottawa, Canada, Jan. 31, 2005.

Paul C. Van Oorschot, Jean-Marc Robert, and Miguel Vargas Martin, "A Monitoring System for Detecting Repeated Packets with Applications to Computer Worms", published online Mar. 8, 2006.

Nicholas Weaver, Stuart Staniford, and Vern Paxson, "Very Fast Containment of Scanning Worms".

* cited by examiner

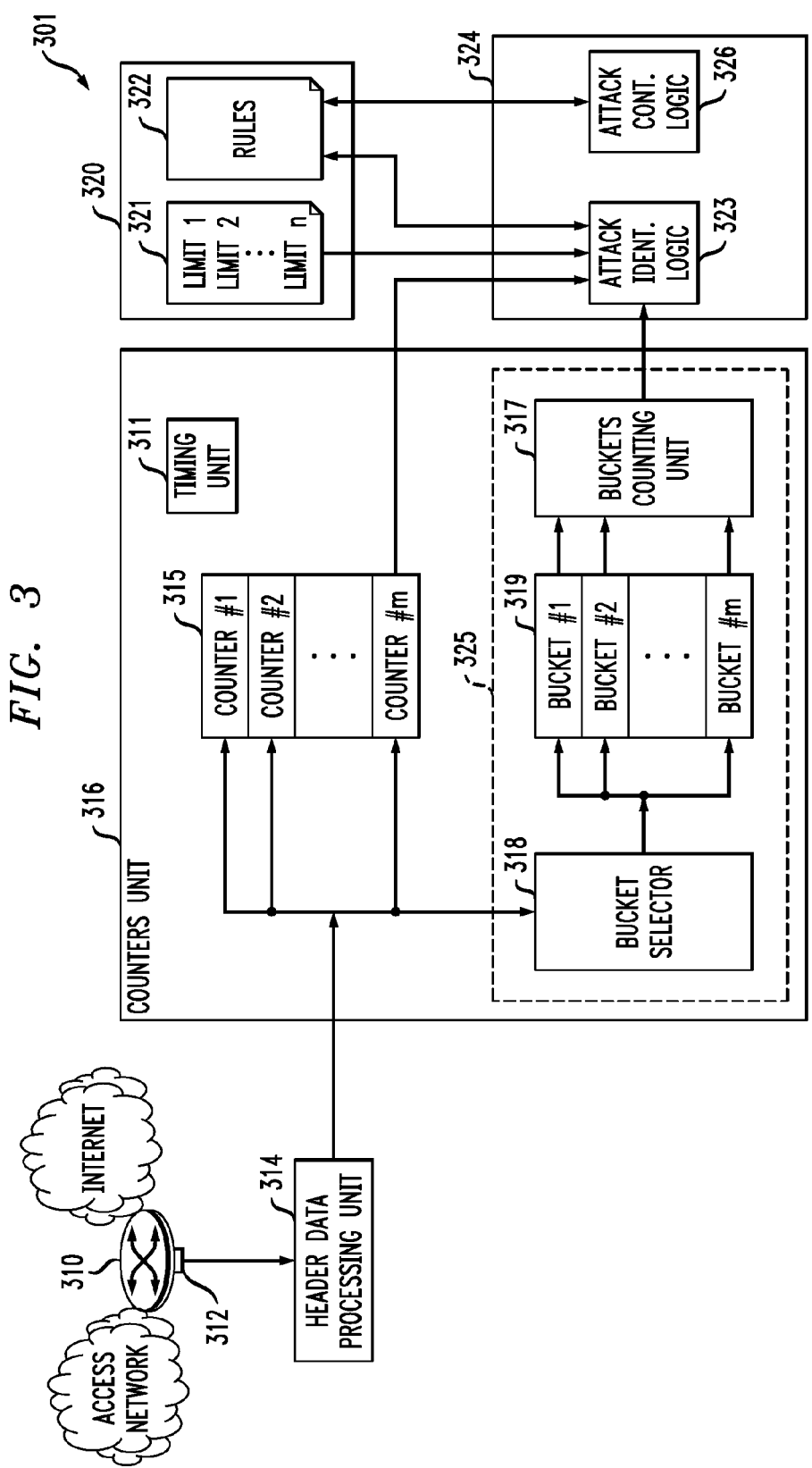

METHOD AND APPARATUS FOR DETECTING MALWARE

CROSS-REFERENCE TO RELATED APPLICATIONS

This application is a continuation-in-part of, and claims any benefit associated with, U.S. patent application Ser. No. 12/145,768, filed Jun. 25, 2008. This application is also a continuation-in-part of, and claims any benefit associated with, U.S. patent application Ser. No. 11/802,965, filed May 29, 2007, now U.S. Pat. No. 7,917,957, issued Mar. 29, 2011, U.S. patent application Ser. No. 11/785,655, filed Apr. 19, 2007, and U.S. patent application Ser. No. 11/656,434, filed Jan. 23, 2007. The entire contents of each of the above identified patent applications are fully incorporated herein by reference.

BACKGROUND

The disclosures made herein relate to a method and apparatus for detecting propagation of malware, for example, via a shared access point of a communication network. While the invention is particularly directed to the art of wireless local area networks (LANs), and will be thus described with specific reference thereto, it will be appreciated that the invention may have usefulness in other fields and applications. For example, the invention may be used in various wireless or wired communication networks, particularly where an access point is shared by multiple users.

By way of background, malicious software (i.e., malware) is software that typically gets installed on a computer without the knowledge of the user. Malware may operate to damage or impair the computer or misappropriate personal or confidential information. Examples of malware include adware, browser hijackers, keyloggers, ransonware, spyware, trojans, viruses, and worms. A worm has the ability to propagate and infect other computers. Worms may be used to spread viruses and other types of malware.

Worms, especially the fast spreading "flash worms", have wreaked havoc on the internet. Worms like Code Red and Nimda, for example, caused major congestions in the Internet and shutdown networks of many enterprises. New worms, such as Storm, use sophisticated scanning methods to avoid being detected. These worms are referred to as "stealthy worms." Stealthy worms generally perform scanning for new victims at a much slower rate than flash (i.e., fast spreading) worms. Stealthy or slow scanning worms are much harder to detect because the detection thresholds for flash or fast scanning worms are rarely hit. As shared access points for communication networks, such as wireless LANs, become more and more prevalent, methods for detection of worms, particularly slow scanning worms, need to be improved and expanded for use in more types of networks.

SUMMARY

In one aspect a method of detecting malware is provided. In one embodiment, the method includes: a) examining header data in each protocol data unit (PDU) transferred by a port of an access switch to at least identify a set of PDUs transferred from a local network device, b) extracting at least one far-end device address for each PDU of the set of PDUs based at least in part on examination of an address portion of the corresponding header data, c) maintaining fan-out information indicative of a quantity of unique far-end device addresses extracted from the set of PDUs during each of a plurality of consecutive time windows, d) determining a current trend based at least in part on the fan-out information for a current time window, e) comparing the current trend to an expected trend, and f) identifying a suspected malware infection in the local network device when the current trend exceeds the expected trend by a trend threshold.

In another aspect an apparatus for detecting malware is provided. In one embodiment, the apparatus includes: a header data processing unit, a data storage logic, a data processing logic, and a malware identification logic. The header data processing unit examines header data in each protocol data unit (PDU) transferred by a port of an access switch to at least identify a set of PDUs transferred from a local network device and extracts at least one far-end device address for each of the set of PDUs based at least in part on examination of an address portion of the corresponding header data. The data storage logic maintains fan-out information indicative of a quantity of unique far-end device addresses extracted from the set of PDUs during each of a plurality of consecutive time windows. The data processing logic determines a current trend based at least in part on the fan-out information for a current time window and compares the current trend to an expected trend. The malware identification logic identifies a suspected malware infection in the local network device when the current trend exceeds the expected trend by a trend threshold.

Further scope of the applicability of the present invention will become apparent from the detailed description provided below. It should be understood, however, that the detailed description and specific examples, while indicating preferred embodiments of the invention, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 3 is a block diagram of an exemplary embodiment of a malware detection (MD) system;

DETAILED DESCRIPTION

Figure 1:
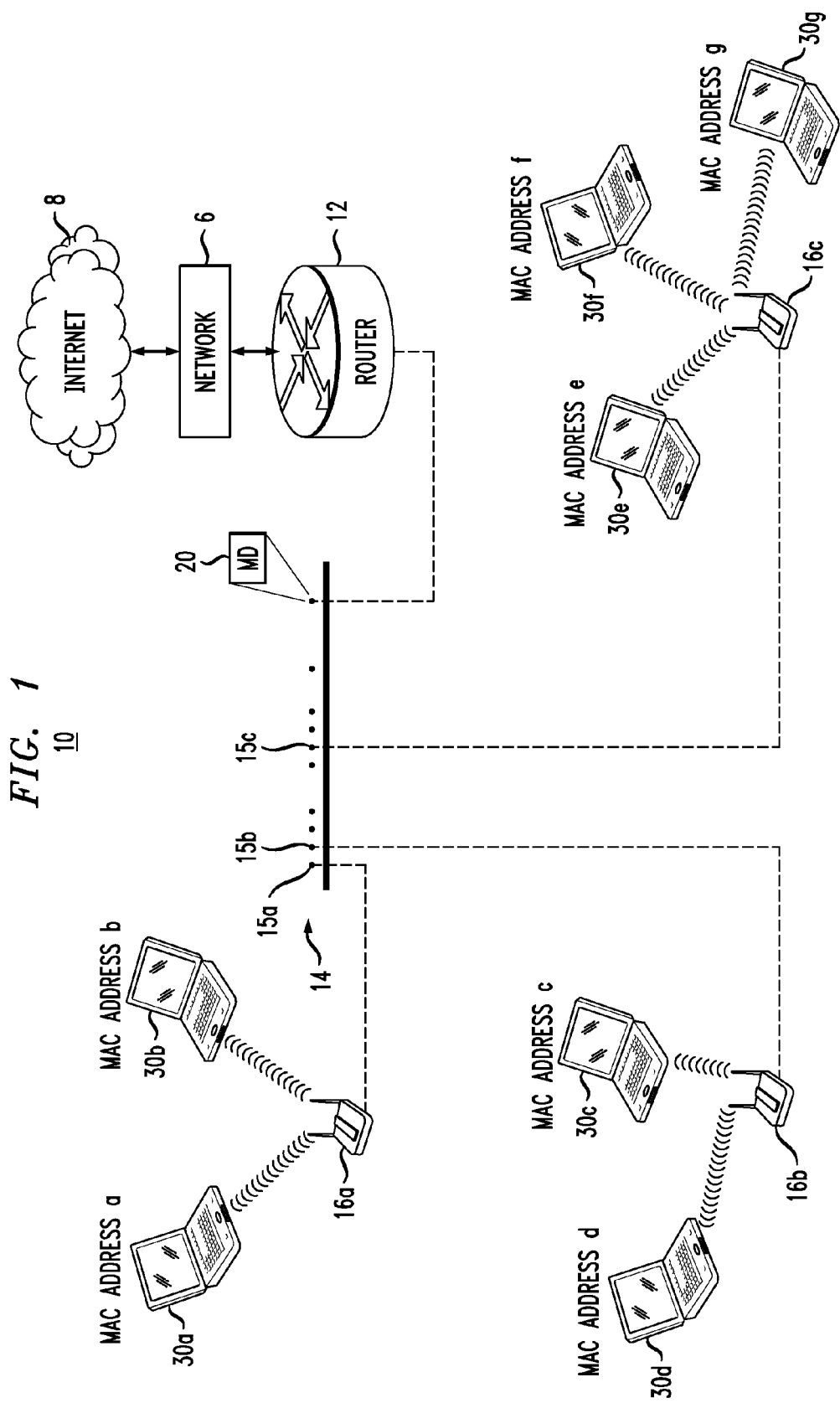
FIG. 1 is interconnection diagram of an exemplary embodiment of a wireless local area network (LAN) in operative communication with the Internet via an external core network.

Several embodiments or implementations of the various aspects of the present disclosure are hereinafter illustrated and described in conjunction with the drawings, wherein like reference numerals are used to refer to like elements. In several embodiments, the various aspects of the present disclosure find particular utility in wireless local area networks (LANs), such as IEEE 802.11 wireless networks (e.g., WiFi networks), in which access switches connect one or more local access points to a core network via one or more routers or other intervening components, and a plurality of clients may be served by a given access switch port, although the disclosure finds utility in association with other networks types, topologies, and architectures beyond those illustrated and described herein.

Referring now to the drawings wherein the showings are for purposes of illustrating the exemplary embodiments only and not for purposes of limiting the claimed subject matter, FIG. 1 provides a malware detection (MD) system for a communication network in which the certain presently described embodiments may be incorporated.

With reference to FIG. 1, an exemplary embodiment of a wireless LAN 10 includes a router 12 that provides operative connection to a core network 6 with ultimate connectivity to any number of such networks, including the Internet 8. The router 12 provides communicative interfacing between the core network 6 and the wireless LAN 10 via one or more wireless access switches 14, individually including one or more ports 15. Any suitable switch may be used which provides network switch functionality such as Alcatel-Lucent OmniAccess Series 6000, 4324, 4308 switch or the like. One or more ports 15 of the access switch 14 are operatively coupled to access points 16a, 16b, 16c. Any suitable access points 16 may be employed, such as Alcatel-Lucent Omni-Access Series AP60, AP61, AP70 or other access points that operatively interface wireless equipped portable computers or other client devices 30 to a corresponding port 15 via a radio access network, where the illustrated access points 16 provide basic radio interface components and functionality with the switch logic being incorporated into the access switch 14. The access points 16 thus constitute nodes of the wireless LAN 10 and function as a central transmitter and receiver of WLAN (i.e., wireless LAN) radio signals. An exemplary embodiment of an access point 16 may include a built-in network adapter, one or more antennas, and a radio transmitter supporting, for example, WiFi wireless communication standards. Generally, an access point 16 may serve a plurality of client devices 30. For example, in one embodiment, an access point may serve up to 255 client devices. While illustrated in the wireless context using WiFi access points, the concepts of the present disclosure may be employed in connection with wired networks in which common or shared access points are, for example, dumb 10/100 BaseT hubs or switches or other shared access points that allow aggregate network access by multiple client devices having unique MAC addresses via a single port.

As depicted in FIG. 1, in a typical scenario, the individual ports 15 of the access switch 14 service more than one client device 30. Client devices 30a and 30b are interfaced to port 15a via access point 16a. Access point 16b interfaces client devices 30c and 30d to port 15b and access point 16c interfaces client devices 30e-g to port 15c. Any number of access points 16 and client devices 30 of the wireless LAN 10 may be thus operatively communicatively coupled with the router 12, core network 6, and Internet 8 via appropriate ports 15 of one or more access switches 14. Of course, in a wireless LAN 10, any given client device 30 may shift from one access point 16 to another as it is moved about within the physical range of the wireless LAN 10.

As used herein, units through which digital data is transmitted from one point to another over a communication path (wired, wireless, or any combination thereof) may be referred to as Protocol Data Units (PDUs). PDUs include data units formatted according to various transmission protocols, such as IP packets, TCP packets, frames, etc. The term "fan-out" may used for outgoing PDU's. As well, various features of the invention described herein may be installed in any area of a network having an adequate sizing for the targeted equipment (i.e., more flows implies a larger amount of memory, etc.).

Any of the elements of the various embodiments of the wireless LAN 10 described above with reference to FIG. 1 may be implemented in any suitable combination of hardware, software, or firmware.

Figure 2:
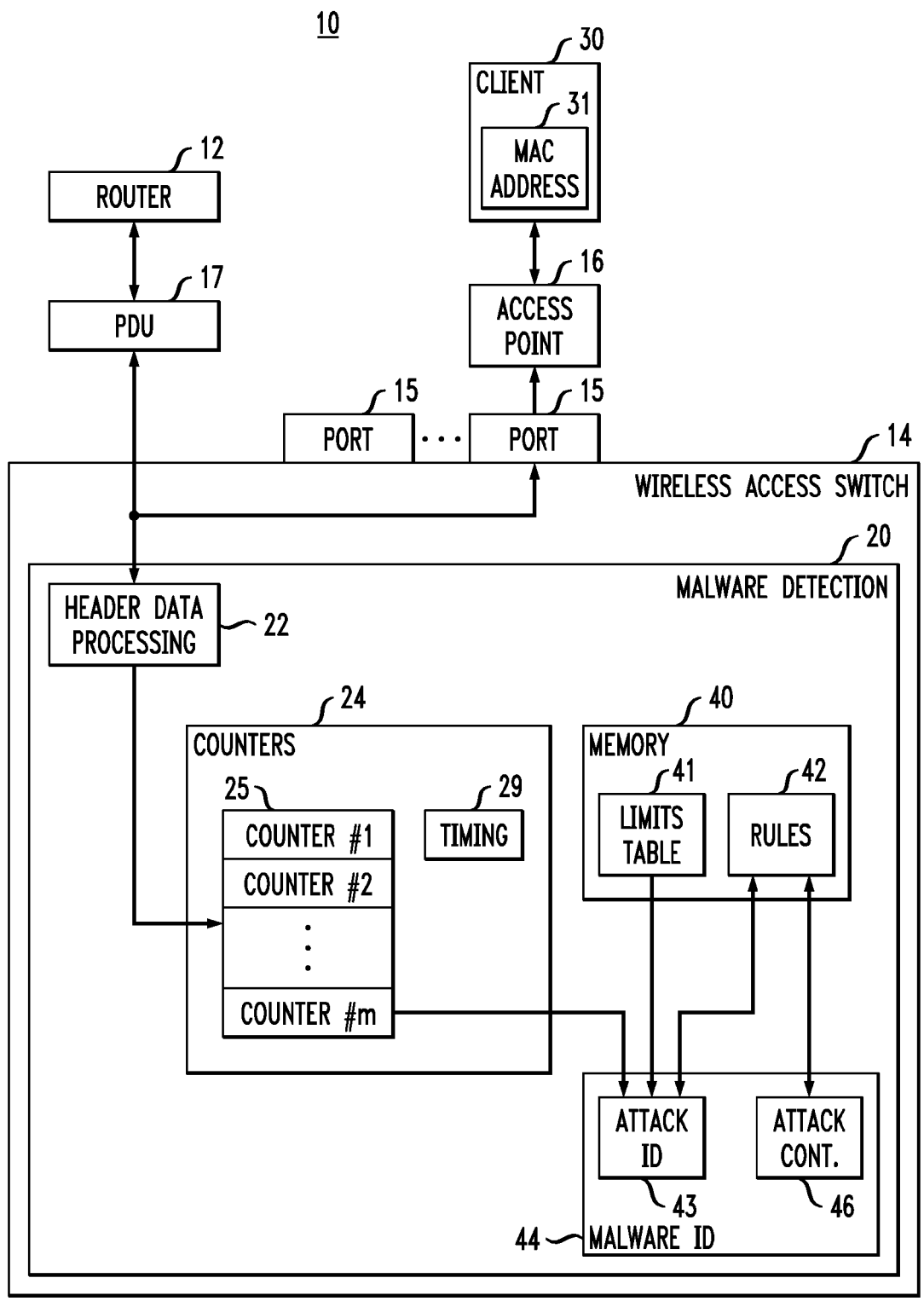
FIG. 2 is a block diagram of an exemplary embodiment of at least a portion of the wireless LAN of FIG. 1.

Referring also to FIG. 2, the illustrated wireless LAN 10 handles network traffic including packets or other PDUs 17. The PDUs 17 are transferred based on the Media Access Control (MAC) addresses 31 of the client devices 30, wherein the MAC addresses 31 are globally unique identifiers (GUIDs) at layer 2 in this implementation in accordance with IEEE 802.11 specifications. In other embodiments, the client addresses used herein can be MAC addresses or other layer 2 addresses, including without limitation Ethernet Hardware Addresses (EHA), hardware addresses, adapter addresses, or other unique or quasi-unique address identifiers associated with network interface cards (NICs) of the client devices 30. As the network interface cards or integral network adapters in any two client devices 30 will have different client addresses (e.g., different MAC addresses in one embodiment), the access switch 14 in the present disclosure can examine the header data of the PDUs 17 to identify a client address 31 with which each PDU 17 is associated, whether incoming or outgoing. Moreover, while it is possible to change the MAC address 31 via spoofing, the malware detection logic 20 of the exemplary access switch 14 is capable of determining suspected client devices uniquely even though a plurality of client devices 30 share a common access point 16 (i.e., share a common port 15). In this regard, possible client addresses include, without limitation, IEEE MAC-48, Extended Unique Identifier (EUI)-48, and EUI-64.

In accordance with the present disclosure, the access switch 14 includes a malware detection logic 20, the details of which are best shown in FIG. 2, that includes a header data processing logic 22 operative to examine header data of PDUs 17 at the access switch 14 to determine a PDU type and a "far-end" MAC address 31 for each PDU 17 based on the header data. The malware detection logic 20 also includes a counter logic 24 that includes a plurality of counters 25 in one embodiment to maintain a plurality of count values for individual client devices 30 (e.g., by individual client device address (e.g., MAC address)) based at least partially on the PDU type determined by the header data processing logic 22.

A memory 40 is provided in the malware detection logic 20, which includes a limits table 41 comprised of preset limits corresponding to each count value and further limits for comparison with results of mathematical operations performed on two or more of the count values, as well as a set of rules 42 that defines malware attack patterns for the shared wireless access switch 14. In addition, the system 20 includes a malware identification (ID) logic 44 including an attack ID logic 43 that selectively identifies client devices 30 that are suspected of being infected with malware based at least in part on the count values, the limits table 41, and the rules 42.

In certain respects, the malware detection logic 20 may operate in the same manner corresponding elements of the malware detection (MD) system 301 described below with reference to FIG. 3. Additionally, the malware detection logic 20 of FIG. 1 may provide for examination of the client address information in the header of the PDUs 17, where the counters 25 and the determination of suspected malware infection is determined on a client address basis, as well as based on a determined PDU type. Thus, counting in the embodiment being described is based on per MAC address instead of per physical port. In this manner, the malware detection logic 20 performs malware detection to the client level for the wireless LAN 10 even though two or more client devices 30 share a common port 15. This detection down to the client level may be vulnerable to "spoofing." Any known anti-spoofing procedure may be used along with the client-level malware detection described herein. Moreover, the malware detection logic 20 and the individual components thereof may be implemented as any suitable hardware, software, logic, or combinations thereof, and any two or more components illustrated and described herein may be combined into a single unitary component, and one or more of the described components described herein may be implemented in distributed fashion as more than one components, or components implemented in different host processing devices operatively coupled with the access switch 14, wherein all such embodiments are contemplated as falling within the scope of the embodiments described herein and the corresponding appended claims.

In the illustrated embodiments, the header data processing logic 22 is operative to determine a MAC address 31 (or another other type of client address as discussed above) for each PDU 17 through examination of the header data or other data portion of the PDU 17, and the counter logic 24 maintains a plurality of counters 25 for each MAC address 31 associated with the access switch 14. The exemplary header data processing logic 22, moreover, is operative to classify each PDU 17 by type for any combination of the following PDU types: i) an ARP request, ii) an ARP response, iii) a TCP SYN request, iv) a TCP SYN/ACK acknowledgment, v) a TCP/RST packet, vi) a DNS/NETBEUI name lookup, vii) a DNS/NETBEUI lookup result, viii) an ICMP packet, ix) an outgoing UDP packet, and x) an incoming UDP packet. The counter component 24 maintains at least one counter 25 for each classified PDU type for each MAC address 31 that is being served by the access switch 14.

The rules 42 in certain preferred embodiments include containment actions for the access switch 14 and the attack ID logic 43 of the malware ID logic 44 operates to identify a type of attack based on the count values, the limits table 41, and the rules 42. In this embodiment, moreover, the malware ID logic 44 provides an attack containment logic 46 that initiates a defense action for containing the identified attack type. In the embodiment being described, the malware ID logic 44 (e.g., the attack ID logic 43) compares one or more of the count values to at least one of the preset limits in the limits table 41 to ascertain whether a worm is to be suspected for a given client device 30, and the limits table includes further limits regarding comparisons or other relationships between two or more count values for inferring malware activity. In this implementation, the malware ID logic 44 performs one or more mathematical computations using two or more count values to derive a result, and compares the result to a further limit from the limits table 41, and based on this and the direct count value comparisons, determines whether malware is suspected.

In operation, the malware detection logic 20 effectively counts packets or other PDUs 17 for each MAC address 31, with the access switch 14 performing PDU encryption/decryption pursuant to the IEEE 802.11 standards, whereby the malware detection logic 20 adds very little additional processing overhead in scrutinizing the PDUs 17 with respect to MAC address 31 and type. In this regard, the malware detection logic 20 may also be implemented in wireline switches to identify worms/malware with respect to specific hosts (as opposed to a port), preferably in conjunction with some form of anti-spoofing in the switch. The solution provided by the embodiment being described can be incorporated into the hardware/software of network access switches described below with reference to FIGS. 3-6 to implement malware detection in the "fast path" in the data planes that deal with each PDU 17.

The malware detection logic 20 establishes and maintains a set of counters 25 and corresponding thresholds in the limits table 41 for each client device 30 associated with the access switch 14. In operation, the counters 25 are reset periodically, with the thresholds being set so as to discern suspected malware activity, and the reset period and thresholds may be user adjustable for tailoring by network operators. If any threshold is exceeded, the corresponding client device 30 may be advantageously isolated for further analysis or other remedial action via the attack containment logic 46.

In the embodiment being described, count values are maintained in the counters 25 for each MAC address 31 for any combination of the following PDU types: i) for out-going ARP requests—a) total number of ARP requests and b) number of different hosts mentioned; ii) for in-coming ARP responses—a) total number of ARP responses, b) number of different hosts responding, and c) number of responding hosts mentioned in out-going ARP requests; iii) for out-going TCP SYN requests—a) total number of SYN requests sent, b) number of distinct far-end hosts, and c) number of distinct far-end host and port number pairs; iv) for in-coming TCP SYN/ACK acknowledgements—a) total number of SYN/ACK received, b) number of distinct far-end hosts, c) number of distinct far-end host and port number pairs, and d) number from hosts/ports that match the host in out-going SYN packets; v) for in-coming TCP/RST packets—a) total number of TCP/RST received, b) number of distinct far-end hosts, c) number of distinct far-end host and port number pairs, and d) number from hosts/ports that match the host in out-going SYN packets. The counters 25 may also maintain count values for any combination of the following PDU types: i) total number of out-going (non-ARP, etc.) broadcasts; ii) for out-going DNS/NETBEUI name lookups—a) total number of lookups and b) number of distinct names looked up; and iii) for in-coming DNS/NETBEUI lookup results—a) number that succeed, b) number that fail, and c) number of intermediate results (e.g., DNS queries can result in a forwarding to another DNS server); iv) for out-going ICMP packets—a) count for each type and b) number of distinct far-end hosts; v) for out-going UDP packets—a) total number of packets sent, b) number of distinct far-end hosts, and c) number of distinct far-end host and port number pairs; vi) for in-coming UDP packets—a) total number of packets received, b) number of distinct far-end hosts, c) number of distinct far-end host and port number pairs, and d) number from hosts/ports that match the host in out-going UDP packets. The embodiment being described is not limited to these specific examples. It is noted, also, that while the above includes many counters 25 for each client address, each packet can only be one of the major types above, whereby the processing per PDU 17 is relatively small, and typically involves only a few tests to determine the type and then increment one or more associated counters 25.

Any of the elements of the various embodiments of the wireless LAN 10 described above with reference to FIG. 2 may be implemented in any suitable combination of hardware, software, or firmware.

In another embodiment, a malware detection (MD) system that may be integrated with existing network equipment is provided. The MD system may be integrated at the edge devices of the network. For example, the MD system may be incorporated into, but not limited to, a network switch, or into the Intelligent Service Access Manager (ISAM), the Digital Subscriber Line Access Multiplexer (D-SLAM), or even the Asymmetric Digital Subscriber Line (ASDL) modem. The network elements listed above by way of example belong to a product family that enables a telecommunications equipment vendor to provide a next generation access network ready for massive triple play (3P) deployments, in terms of bandwidth, service intelligence, IP/Ethernet features and scalability. Thus, the ISAM is a wire-speed IP DSLAM, tailored for non-blocking 3P services delivery; the D-SLAM is a DSL (digital subscriber line) access multiplexer that operates into an IP/Ethernet aggregation network; and ADSL supports high-speed data communications on top of traditional telephone service on a single telephone access line, for transforming an operator's existing copper twisted pair investment into a multimedia broadband distribution system.

With reference to FIG. 3, a block diagram of an exemplary embodiment of an MD system 301 includes a network element (NE) 310 with a port 312; NE 310 is connected in this example at the border between an access network and the Internet. In this embodiment, PDU's can include, for example: ARP requests, TCP/SYN requests and acknowledgements, TCP/RST packets, DNS/NETBEUI name lookups, out-going ICMP packets, UDP packets, etc. In these examples, Address Resolution Protocol (ARP) is a TCP/IP protocol used to convert an IP address used on the transport network into a physical address such as an Ethernet address used on a LAN/MAN/WLAN. ARP requests and responses may be present on port 312 if the NE uses) ARP. In this case, when the NE wishes to obtain a physical address of a host on the access network, it broadcasts an ARP request onto the access network. The host on the access network that has the IP address in the request then replies with its physical address. There is also Reverse ARP (RARP) used by a host to discover its IP address. In this case, the host broadcasts its physical address and a RARP server replies with the host's IP address.

NE 310 may also use IP/TCP. It is known that in order to establish a connection, TCP uses a "3-way handshake", by exchanging packets of a specific type. The Internet Protocol header carries several information fields, including the source and destination host address information. The header also includes six control bits (or flags) that are set according to the packet type. A SYN flag is set in a packet during the three-way handshake, and is used to synchronize sequence numbers of the packets in the respective flow. When a normal TCP connection starts, a destination host receives a SYN (synchronize/start) packet from a source host and sends back a SYN ACK (synchronize acknowledge). The destination host must then hear an ACK (acknowledge) of the SYN ACK before the connection is established.

When an end-point of a TCP connection wishes to stop its half of the connection, it transmits a FIN packet, which the other end acknowledges with a FIN/ACK. A FIN flag is set in a packet during the graceful teardown of an existing connection, and is used to indicate that there is no more data from sender. RST flag is set to request reset of a connection. A typical connection teardown requires a pair of FIN and FIN/ACK segments from each TCP endpoint.

Other types of PDU on port 312 may use Domain Name Systems (DNS) for translating names of network nodes into addresses. Network Basic Input/Output System (NetBIOS) is a transport protocol, connecting network hardware with the network operating system; it enables lookups in the DNS. NetBios Extended User Interface (NETBEUI) is an enhanced version of the NetBIOS protocol used by network operating systems such as LAN Manager, LAN Server, Windows for Workgroups, and Windows NT.

Returning now to FIG. 3, the MD system 301 monitors the PDU's arriving on port 312. The monitoring may be performed on selected ports or on all ports of a NE 310; FIG. 1 shows only port 312 by way of example. In broadest terms, MD system 301 includes a header data processing unit 314, a counters unit 316, a storage device 320 (e.g., memory) for storing a limits table 321, an attack ID and containment (AIC) unit 324, and a timing unit 311.

Header data processing unit 314 monitors the PDU's seen on the port 312 and examines the data in various fields of the PDU's header with a view to determine the PDU type with a view to establish which counter of the counters unit 316 should be updated. The "type" of a PDU is established based on the information in the header and identifies an action initiated by the PDU. Examples of PDU types are, SYN_in, ARP_query in, etc. For example, the SYN_in packets are identified by examining if the respective flag is set in the header of an incoming IP/TCP packet. The header data processing unit 314 monitors the header in both the incoming and outgoing directions. As used herein, the term "seen" may refer to the PDUs that arrive on port 312 from far-end hosts (incoming PDU's) or to the PDU's that are transmitted from port 12 to far-end hosts (outgoing PDU's). It is to be noted that the term "traffic direction" may be used to identify the "outgoing" and "incoming" PDU's. The terms "outgoing" and "incoming" are used here relative to the port 312 of the NE 310.

Header data processing unit 314 can be built in hardware, in which case it can comprise simply a number of comparators for each bit position of interest in the PDU header. A hardware-based solution could also use a content addressable memory (CAM) to detect the specific fields in the packet header. Alternatively, a simple software module can be used to test the respective fields in the header. Other alternatives will be evident for persons skilled in the art.

Counters unit 316 includes a plurality of counters 315, also referred to as simple counters, and a complex counters unit 325. Complex counters unit 25 may be used in more sophisticated implementations of MD system 301, for example, for determining the number of far-end hosts, as described later. It is to be noted that there can be multiple "complex counters" 325, for each port that is to be protected.

The content of a counter 315 may be referred to using the term "count value." Each counter 315 is associated with a particular type of PDU and is incremented when the corresponding PDU is detected. As such, each PDU seen on port 312 updates zero, one or more of the counters; the number (and implicitly the types) of counters 315 is a design parameter that depends on the type of information that is to be collected at the respective port. Thus, NE 310 may be equipped with ARP counters for counting the ARP requests (queries) and responses, respectively: an ARP_query_in packet will update an ARP_query_in counter 315, an ARP_response_out packet will update the ARP ARP_response_out counter, etc. More information of the traffic is obtained when the port is provided with a complex counter unit 325 which, for example, enables counting the number of far-end hosts. In this case, for outgoing ARP requests, a counter 315 counts the total number of ARP requests and complex counter unit 325 determines the number of different hosts mentioned in the requests. Similarly, for the incoming ARP responses, the counters count the total number of ARP responses, the number of different hosts responding and the number of responding hosts mentioned in outgoing ARP requests.

The plurality of counters 315 may also include TCP counters for the SYN and SYN/ACK packets. Now, for outgoing SYN requests, the TCP counters count the total number of SYN requests sent, the number of distinct far-end hosts and the number of distinct far-end host and port number pairs. For incoming TCP SYN/ACK acknowledgements, the TCP counters count the total number of SYN/ACK received and complex counters unit 325 determines the number of distinct far-end hosts, the number of distinct far-end host and port number pairs, and the number from hosts/ports that match the host in out-going SYN packets.

In a similar way, for the incoming RST packets, a counter 315 counts the total number of RST packets received, and complex counter unit 325 counts the number of distinct far-end hosts, the number of distinct far-end host and port number pairs, and the number of hosts/ports that match the host in out-going SYN packets. For other connection types (non ARP, etc) the counters count the total number of outgoing broadcasts.

The plurality of counters 315 may also include DNS counters used for obtaining statistics on DNS/NETBEUI lookups. For the outgoing DNS/NETBEUI lookups, the DNS counters may count the total number of lookups and the number of distinct names looked up for the incoming requests. For incoming DNS/NETBEUI lookups, the DNS counters may count the number of successful lookups, the number of failed lookups and the number of intermediate results, which are DNS queries that result in a forwarding to another DNS server.

Counters 315 may also be used for counting each type of outgoing ICMP packet. Internet Control Message Protocol (ICMP) is an extension to the Internet Protocol (IP), which supports packets containing error, control, and informational messages.

As well, UPD packets may be counted in designated UPD counters. The User Datagram Protocol (UDP) is a minimal, datagram-oriented, transport network protocol above the IP network layer that does not guarantee data ordering or delivery. Because it is datagram oriented, each send operation by the application results in the transmission of a single IP datagram. This mode of operation contrasts with the TCP, which is byte stream oriented and guarantees the delivery and ordering of the bytes sent. In one embodiment of the invention, the UDP counters for outgoing UDP packets count the total number of packets sent, the number of distinct far-end hosts and the number of distinct far-end host and port number pairs. For the incoming UDP packets, the UDP counters keep track of the total number of packets received, the number of distinct far-end hosts, the number of distinct far-end host and port number pairs and the number from hosts/ports that match the host in out-going UDP packets.

It is to be noted that the above list of counters 315 is not exhaustive. Table 1 provides the types of counters used in an exemplary embodiment of the MD system 301. As indicated above, the terms incoming (in) and outgoing (out) are used relatively to port 312.

TABLE 1

| PDU type | Counter type (counted feature) |
| --- | --- |
| ARP_query_in | # of sources in the local subnet |
| ARP_query_out | # of intended destinations in the local subset |
| ARP_response_in | # of intended destinations in the local subnet that actually exist |
| ARP_response_out | # of times we answered sources in the local subnet |
| SYN_in | # of attempted in-coming TCP connections |
| SYN_out | # of attempted out-going TCP connections |
| SYNACK_in | # of attempted out-going TCP connections that the destination accepted |
| SYNACK_out | # of attempted incoming TCP connections that the host accepted |
| FIN_in | # of in-coming scans (not really used) |
| FIN_out | # of out-going scans |
| FINACK_in | # of in-coming socket-closes |
| FINACK_out | # of out-going socket-closes |
| RST_in | # of in-coming resets |
| Unreachable_in | # of times destination not reachable (for any reason) |

It is to be noted that even though the list of counters is very long, each packet can only be of one protocol TCP, ARP, UDP, etc, so the work per packet amounts to a few tests to determine the type of packet and then increment a few counters for the respective protocol.

The MD system 301 maintains limits table 321 in any suitable memory available at the NE 310; this is generically shown by storage device 320. Limits table 321 maintains individual limits for each counter, as well as composite limits for groups of counters that involve performing some simple operation on the count value in a number of counters. Storage device 320 also stores a rules set 322 defining attacks and containment actions for the respective attack. The rules in rules set 322 are configurable for each port with a view to detect anomalous traffic patterns, having in view the known patterns for the legitimate traffic, etc. Another variant of the limits table 321 is to keep probabilistic limits, whereby the counters track the count values and the limits are pre-converted to a probabilistic value.

Preferably, the limits are set or changed by the NMS (network management system) or the OSS (operation support system) of the respective network (not shown). Since most networks use DHCP to assign IP addresses, the NMS can immediately download a set of boundaries tailored for the class of hosts. This can be a function of the host MAC address, physical port, virtual LAN (VLAN) assignment, or any other local characteristics.

Dynamic limits in conjunction with distinct containment actions (or responses) may also be envisaged. For example, it is possible to initially set the boundaries for certain counters 315 to be tight, and to respond with a containment action for these boundaries that only slows-down the port 312 when the boundary is triggered, rather than shutting it down. In this way, the NE 310 gets an early alert of a possible attack being under way, without overly annoying the user(s). When specific counters 315 trigger alerts, the response could be to automatically loosen the limits. This type of response is useful during initial setup to adaptively set limits for servers, etc.

The AIC unit 324 comprises attack ID logic 323 for identifying an attack, and attack containment logic 326 which triggers an appropriate defensive action based on the attack type. Thus, attack ID logic 323 calculates composite count value from individual count values as needed and compares the individual and composite count values against the corresponding individual and composite limits. If one or more limits are crossed, attack ID logic 323 identifies a probable type of attack based on the rules in rules set 322. If NE 10 is equipped with a complex counters unit 325, attack ID logic 323 identifies an attack by correlating the limits that were crossed for individual/composite count values provided by counters 315 and the number of far-end hosts provided by complex counters unit 325. In short, if the count value in one or more counters crosses a limit/threshold, AIC unit 324 identifies in rules set 322 the particular rules disobeyed by the respective traffic flow on port 312.

Once the type of attack has been identified, attack containment logic 326 triggers a certain defensive action, again based on rules in rules set 322. Ideally, AIC unit 324 should check the limits each time a counter is changed. While this mode of operation gives the fastest response time, it requires processing power in the data path. Preferably, a time window TW is set for each counter according to the type of the respective counter. Most counters 315 may use a very short time window, e.g. 5 seconds. For example, the ARP_failures counter is a pretty unambiguous indicator of scanning of the local sub-net, so it should trigger its limit immediately. Other counters are more statistical in nature, so a longer interval—say thirty seconds, is reasonable. For example, the counters for the TCP/IP packets need longer windows since the duration of a connection may extend over longer periods of time, etc.

Table 2 gives examples of different rules used by the MD system 301 and provides the rule name, the time window for assessing compliance with the limit set for the respective rule, the individual/composite count value relevant to the respective rule (and how the composite value is obtained), the limit for the rule, and the (probable) attack type. Examples of individual count values are ARP_query_out that indicates the number of peers on a local subnet, and the RST_in that indicates the number of RST packets received by port 312. An example of a composite count value is SYN_out−SYNACK_in, which indicates the number of outgoing attempts that fail.

In Table 2, limit a) for SYN_failure (denoted with "See a") provides the number of out-going connections that fail, as calculated from SYN_out−SYNACK_in. During normal usage, almost all outgoing connections succeed. There are some cases where a lot of outgoing connections fail, such as for example in the case of P2P software where the destination may be turned off. A two-part rule is used for detecting this: i) If SYN_out is small, no action taken; and ii) If SYN_out is large (say 10 attempts in 30 seconds), failure rate over 20% is cause for alarm.

Limit b) (denoted "See b") is set for indicating a port scan. Normally, the number of ACK outgoing packets occurring in response to incoming SYN packets (SYNACK packets) is expected to be close to the number of the SYN packets. When there are too many outgoing SYNACK packets, it is probably a port scan. A two part test is used: i) If SYNACK_out−SYN_in is small, no action; and ii) If the difference is >2, a ratio of (SYNACK_out/SYN_in)>0.20 is a port scan.

Limit c) for FINACK_diff (denoted "See c") indicates a mismatch between the numbers of FINACK packets in the two directions. During normal usage, the two should track very closely, irrespective of which side started the FIN sequence. If the host sends more than it receives, this is an indication of a scan, such as for example the XMAS tree scan with all the flags set. A two part test is used: i) If the absolute difference between the incoming and outgoing FINACK packets is small, no action; and ii) If the absolute difference is large (5 more FINACK packets sent than received in 30 seconds), then FINACK_out/FINACK_in or FINACK_in/FINAcK_out>1.2 is cause for alarm.

Limit d) (denoted "See d") provides the number of incoming RST packets. Each RST packet is possibly the response to a scan attempt, but RST is also used in many legitimate cases, so the trigger is set relatively high, for example 50 RST packets in 30 seconds.

Some examples of rules using an individual limit follow: i) If countSYN>100, a worm tries to connect to many hosts; ii) If countUDPout>100, a worm tries to connect to many hosts with UDP; and iii) If countARP>100 a worm probes the local sub-net.

Examples of rules using a composite limit are given below: i) A (countSYN−countSYNACK)/countSYN>0.15 indicates a low percentage completion of TCP; ii) A (countUDPout−countUDPin)/countUDPout>0.15 indicates a low percentage completion of UDP; or iii) A (countRST+countICMPnonreachable)>19 indicates that many far-ends refuse to talk or are unreachable.

TABLE 2

| Rule Name | TW | Count Value | Limit | Attack Type |
| --- | --- | --- | --- | --- |
| ARP_failure | 5 | ARP_query_out−ARP_response_in | >1 | # of times the host tried to talk to non-existent peers in the same subnet. |
| ARP_poison | 5 | ARP_response_out−ARP_query_in | >1 | # of un-solicited ARP responses from the host, typically ARP poisoning attempts |
| ARP_count | 30 | ARP_query_out | >10 | # of peers on local subnet |
| SYN_failure | 30 | SYN_out−SYNACK_in | See a | # of outgoing attempts that fail |
| SYNACK_scan | 30 | SYNACK_out−SYN_in | See b | Too many outgoing SYNACK, probably scan |
| FIN_scan | 5 | FIN_out | >1 | # of out-going FIN scan |
| FINACK_diff | 30 | FINACK_out−FINACK_in | See c | Mismatch of FIN + ACK count for the two directions, possibly XMAS tree scan |
| RST_count | 30 | RST_in | See d | Too many incoming RST |
| Unreachable_count | 30 | Unreachable_in | >20 | Too many incoming destination-unreachables |

Still further, composite limits may be set as combinations of above conditions. For example if ((countSYNhosts>50) and (countSYN−countSYNACK>30)) a worm tries to connect too many hosts but only gets through to some.

It is to be noted that not all equipment within a network needs to implement all of the counters, limit and rules provided above. Each implementation may chose some subset depending on the protection required, the memory footprint, the processing powers of the fast data-paths, the processing powers of the slow control-path, and so on.

After all the counting is done, attack ID logic 326 checks the count values against the limits in limits table 321 and identifies the attack type based on rules set 322. Then, attack containment logic 326 can take a number of actions, based on the attack type and its gravity, based on pre-set rules in the rules set 322, such as: i) Shut down the port 312 totally, until manually reset (e.g., this would be suitable for rules that have very low false-positive); ii) Quarantine the port 312 to a VLAN that is dedicated to remediation only, where virus scanners and other tools can be brought to bear; iii) Quarantine the port 312 to a honey pot VLAN so that the worm can be observed in action; or iv) Shut down the port 312 temporarily (e.g., for 1 second, then for 2 seconds, then for 4 seconds, doubling each time; this is suitable for rules that have fuzzy boundaries when legitimate users may occasionally reach the limit, this action means we only slow down the user at the limits (so legitimate users are not greatly affected) but worms will be slowed down and eventually shut down).

Because the detection is done in the "fast" path, the above actions can be taken immediately, including discarding the very packet that triggered the action. Also, because the detection is performed at the very edge of the network, the action taken is highly specific to a single host, or a small number of hosts connected to a physical port.

As indicated above, counters for each side (far-end and near-end), or for each direction of traffic are kept separately. Keeping separate counts for each direction eliminates the need to match up request/response pairs for each connection, simplifying the malware detection. This eliminates the need to keep a list of the far-end host addresses, which would consume a lot of memory and CPU cycles. While such lists may enable more accurate malware detection, it may be prohibitively expensive to count the number of far ends, to remember and match up each IP/port combination for each packet; the usual methods are rather slow and may use too much memory. Providing the physical ports 312 of an NE 310 (e.g., a switch) with the MD system 301 results in determining which port is under attack without relying on the packets to identify the culprit such that free anti-spoofing is obtained.

A more accurate detection can be provided by counting distinct IP addresses of the far-end hosts; these could be just far-end IP addresses or IP address-port combinations. Usual methods of keeping track of far-end hosts would, again, run into CPU and memory limitations. Rather than using lists of addresses for far-end hosts for the incoming PDU's, the MD system 301 uses a complex counters unit 325 to keep track of the number of far-end hosts. This technique is much faster than keeping address lists, saves processor cycles and memory at the expense of accuracy.

With continued reference to FIG. 3, complex counters unit 325 comprises a plurality of buckets 319, a bucket selector 318 and a buckets counting unit 317. For example, the complex counters unit 325 may be equipped with a buckets counting unit 317 for each direction of traffic and each protocol type. Preferably, the buckets 319 are provided in the form of an array of a selected size. It is to be noted that while it is desirable to maintain distinct buckets 319 of far-end hosts for each of the PDU categories listed above, it is possible to combine one or more PDU categories for a given far-end host in the same bucket 319. For example, there may even be value in using only a bucket 319 (or complex counter unit 325) for all incoming and outgoing packets.

The point is to hash the address data from the fields of the header that identify the far-end host, as generically shown by bucket selector 318. The hash value obtained is then used as an index into the buckets 319 (e.g., an array), and the specific bucket 319 (e.g., bit) corresponding to the respective hash value is set. Alternatively, buckets counting unit 317 can count the buckets 319 that are not set (or unset). In this way, each bucket 319 is associated with a certain far-end host address. Buckets counting unit 317 determines how many buckets are set over a certain time TW. The count of set (or unset) buckets 319 indicates how many far-end hosts received/transmitted traffic during that time interval. An attack may be for example detected if the quantity of far-end hosts is suspiciously high.

A bucket 319 is set only once during the time window, using a very simple algorithm. If bucket selector 318 identifies a bucket (e.g., bucket #i) from the plurality of buckets (e.g., Bucket #1 to Bucket #m), and that bucket has already been set, nothing happens. If, on the other hand, Bucket #i has not been set yet, it is set. The pseudo code for bucket updating step is:

```
Declare seen as Boolean[m];      set m buckets
Bucket = hash(IP, port);         hash to find bucket number
If (seen[bucket]);               already seen this bucket, do nothing
else;                            have not see this bucket
   count = count + 1;
   seen[bucket] = true;
endif
```

The obvious way to determine the quantity of buckets 319 that are set (or unset) is to loop over each bit, or to take each byte and look up a table; both these approaches are fairly slow. On the other hand, the MD system 301 may use an algorithm that basically treats each bit as an individual number and sums pair in parallel. With this approach, it takes around a dozen instructions to count the number of bits set in a 32-bit word.

Preferably, bits that are hashed are the IP address bits of the packet, or the IP address bits and the port number bits. This data is referred to in the following as address data. In an exemplary embodiment, the buckets 319 may be implemented on a bit array of 256 bits (m=256) and the hash function selected reduced this number to 8 bits. Since the IP address space is 32 bits, for an 8-bit hash, there is a choice of 224 combinations in the same bucket 319. In other words, 224 different combinations of address data may set the same bucket 319.

This means that an attacker could attempt to avoid the triggers by talking to hosts/ports that fall into the same bucket 319 in order to keep the number of far-end hosts low. Certain countermeasures may be used with a view to address this situation.

Figure 4A:
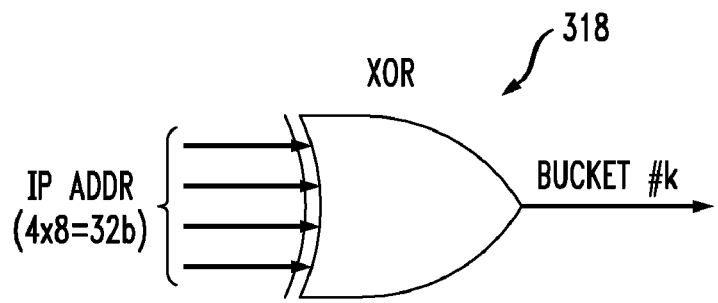
FIGS. 4a-c are symbolic device representations of exemplary embodiments of a bucket selector for the MD system of FIG. 3.
Figure 4B:
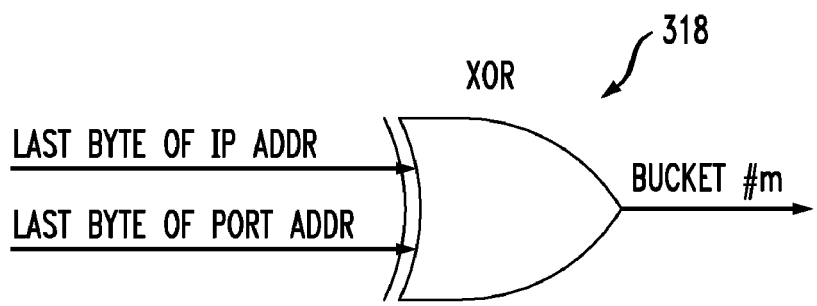
Figure 4C:
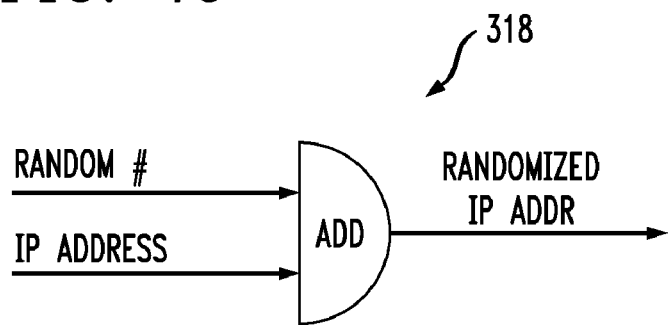

For example, the hash function may be designed so that addresses in the same subnet are likely to use different buckets 319 (this is the "randomize" property that is expected from hash functions). XOR-ing the four address bytes together, as shown in FIG. 4a, will differentiate the sub-networks. XOR-ing the last byte of the IP address and the lower byte of the port number, as shown in FIG. 4b, will ensure that neither horizontal scanning (same port number, different IP address) nor vertical scanning (same IP address, different port) will end up in the same bucket 319. Another solution is to add a randomizer to the hash function, as shown in FIG. 4c. Thus, a random 32 bit number may be picked at boot time, and added to the IP address before doing the XOR. This preserves the sub-net scattering property above and is difficult for the attacker to stay in the same bucket 319. In general, selection of the function depends on the complexity of the attack detection desired.

As discussed above, each port 312 (or any combination of ports 312 of interest) may be equipped with the MD system 301. It is not necessary to synchronize the polling for all the ports 312 of the NE 310. In other words, spreading out the polling does not impact negatively on malware detection (e.g., worm detection). Depending on the platform, one way is to integrate the polling of the counters unit 316 (e.g., counters 315 or buckets counting units 317) with SNMP polls, which means checking the counters unit 316 (e.g., counters 315 or buckets counting units 317) of a port 312 as the SNMP for that port 312 is processed. Also, realistically, there is no need for high precision in the polling interval, so it can be done as a low priority task.

A "linear counting" function is preferably used for hashing the address data, as described in Kyu-Young Whang et al., "A Linear-Time Probabilistic Counting Algorithm for Database Applications," which presents a thorough mathematical treatment of these counting techniques. The entire contents of this Whang publication are fully incorporated herein by reference. This type of function has been selected because it is the most accurate of the whole family of probabilistic counting techniques. An estimate of the actual linear count, as derived in Whang, is provided by the following equation:

$$\hat{n} = -m^* \ln(z/m)$$

where m is the array size, z is the number of unset entries in the array, and n is the real count.

The error estimate for this type of function, as derived in Whang, is provided by the following equation:

$$StdErr(\hat{n}/n) = \frac{\sqrt{m(\exp(t) - t - 1)}}{n}$$

where t is a load factor determined by the n/m ratio.

Whang also gives guidelines for obtaining a desired accuracy. Under the Whang guidelines, it is noted that the size of the array (e.g., buckets 319) may be reduced significantly from the 256 bits discussed above, without a significant impact on the accuracy of malware detection. A smaller array is desirable in order to make the implementation easier in software. For the MD system 301, if array 319 has four bytes (rather than a 256), the resulting accuracy has a 17% error rate. For a two byte array, the accuracy drops to a 35% error rate. This means even a very little memory space dedicated to the array still enables comprehensive results.

It is also possible to transfer relevant counts to an NMS/OSS to do long term (as in minute/hour) analysis to detect very low-rate stealthy worms.

In an exemplary operation of the MD system 301, assume that there is a TCP flash worm scanning the local sub-net by address. This will cause a large number of ARP requests, with a smaller number of ARP responses (basically, only the addresses with an actual host will respond). The ARP's that succeed will be followed by SYN packets trying to establish connections. Having in view that the limits are configurable, this kind of worm will be caught by any of: i) If countARP>100; this limit triggers if the subnet has too many addresses that are unused; ii) If countSYN>100; this limits triggers if most the addresses are in use, so the worm will try to talk to them all; iii) If (countSYN−countSYNACK)/countSYN>0.15; this limit triggers when most of targets refuse to respond to the worm (since the worm is just blindly probing); and iv) If countSYNhosts>100; this limit triggers when the worm actually succeeds in finding and talking to a lot of hosts. Similarly, a UDP flash worm will be caught if it violates any of the limits for the corresponding UDP counters.

In a second exemplary operation, assume that a SYN flood attack originating from port 312. Any high intensity attack will be easily detected by the limits set for the SYN counter. Even low intensity attacks will be caught by a rule established for the difference between the number of SYN and SYN/ACK packets: (countSYN−countSYN/ACK)/countSYN.

In a third exemplary operation, a targeted worm, namely a worm that does not blindly scan addresses, but uses a contact book to get machine names, will be caught by any of: i) If countARP>100; ii) If countSYN>100; iii) If (countSYN−countSYNACK)/countSYN>0.15; iv) If countSYNhosts>100; and v) If countNameLookup>100.

In a fourth exemplary operation, assume that a Smurf attack, is underway, i.e. an attack that sends many broadcast packet eliciting response packets to the originator, which is forged to be the victim's IP address, will be caught jf countBroadcast>100.

Figure 5:
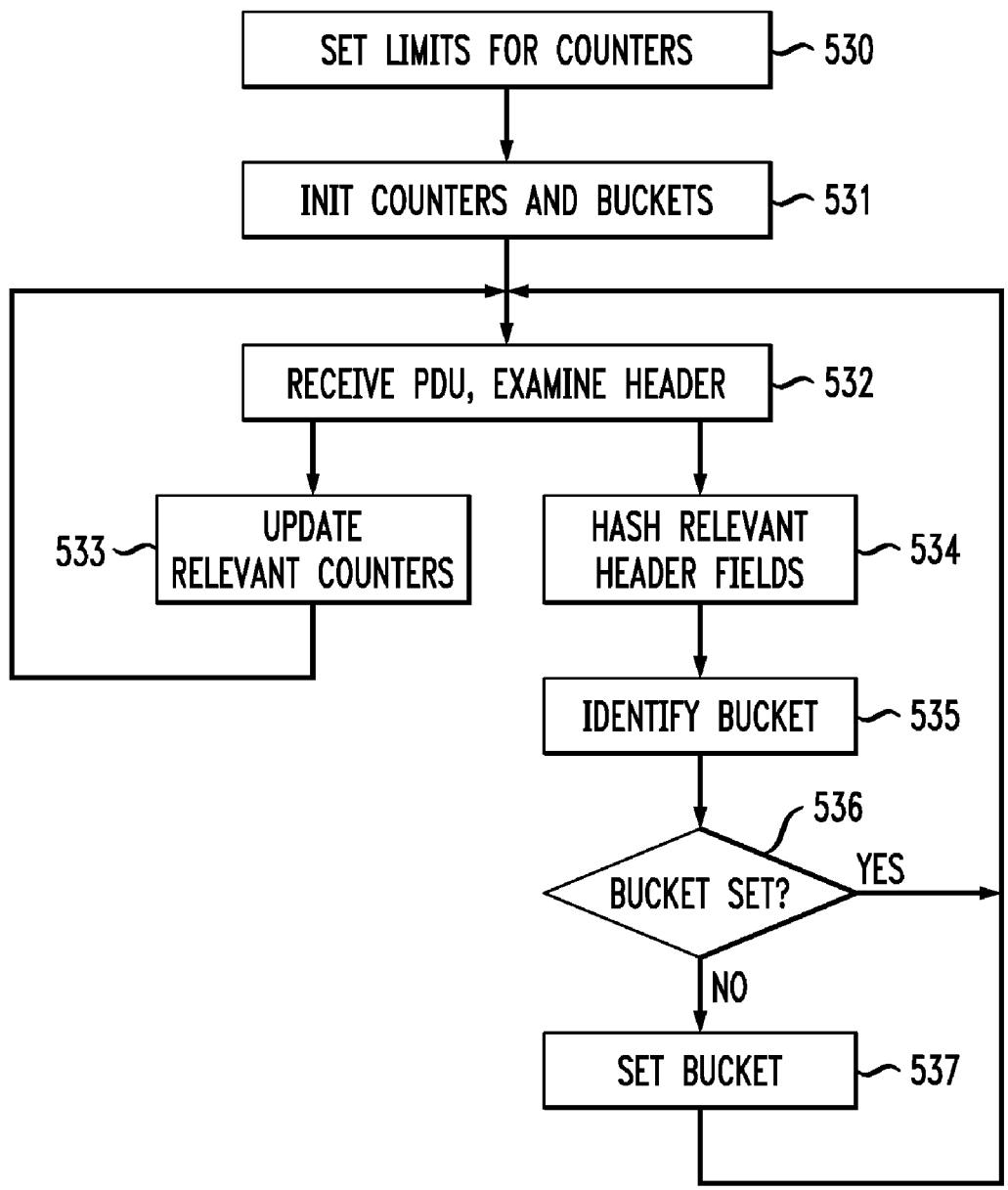
FIG. 5 is a flow chart of an exemplary embodiment of a process for monitoring traffic in conjunction with the MD system of FIG. 3.

With reference to FIGS. 3 and 5, an exemplary embodiment of a method of monitoring the traffic in the fast datapath using an MD system 301 begins at 530 where the limits are established in limits table 321. Next, the counters 315 and buckets 319 (e.g., array) are initialized (531). It is noted that all counters 315 may be initialized at regular intervals of time, or may be initialized at the end of the respective time window. As well, the AIC unit 324 may interpret the counts at regular intervals of time, after a certain number of time windows elapsed, etc; these are design implementations that can be executed in different ways, as is well known.

The method involves then the following main steps, executed for each PDU received over the time window: at 532, header data processing unit 314 monitors port 312 and examines the header of the PDU's received on that port; at 533, the data in defined header fields is used to identify the type of PDU and to update the relevant counters 315. In the meantime, if the MD system 301 is provided with the complex counters unit 325, the relevant address data is hashed (534) to identify a bucket 319 corresponding to that hash value (535). If the bucket 319 identified by the hash is not set, shown by the NO branch of decision block 536, it is set at 537. If not, as seen by the YES branch of decision block 536, the bucket 319 is left unchanged and the next packet is examined, etc. Note that for simplicity, only one hashing is shown; it is possible and sometimes desirable to use multiple hashings.

Any of the elements of the various embodiments of the process described above with reference to FIG. 5 may be implemented in any suitable combination of hardware, software, or firmware. Likewise, any of the elements of the various embodiments of the MD system 301 described above with reference to FIGS. 3 and 4 may be implemented in any suitable combination of hardware, software, or firmware.

Figure 6:
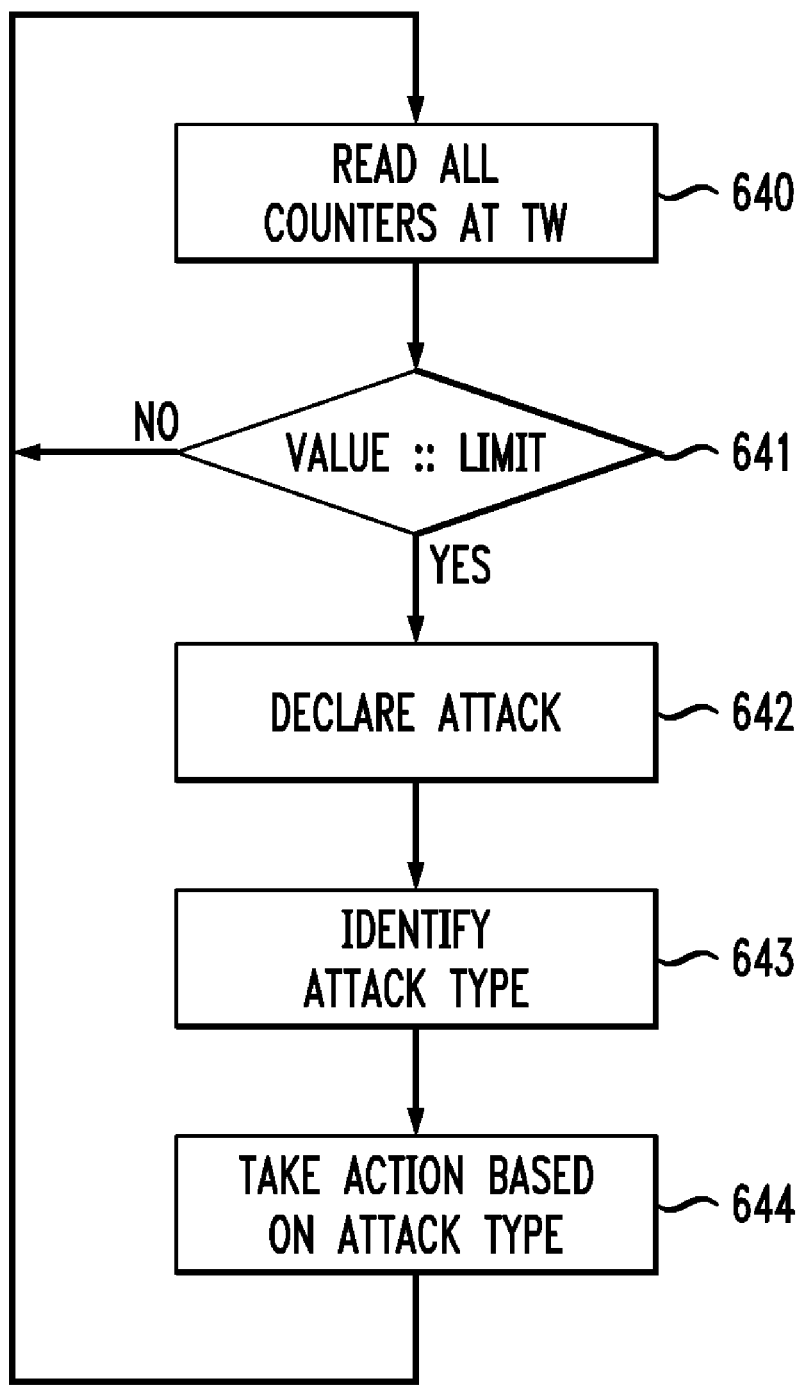
FIG. 6 is a flow chart of an exemplary embodiment of a process for identifying a suspected malware infection in conjunction with the MD system of FIG. 3.

With reference to FIG. 6, an exemplary embodiment of a method of identifying an attack begins at 640 where, after processing the packets received during TW (e.g., see FIG. 5), all counters are read. At 641, the attack ID logic 323 compares the counter values against the limits. If any limits were exceeded, an attack is declared (642). At 643, the attack type is identified based on the counter 319 or combination of counters 319 that violate(s) the limit(s). Next, an appropriate defense action is triggered according to the rules set(s) 322 that were violated (644).

As described above, various embodiments of the invention may collect, for each source, during a predetermined time window (TW), a representation of the set of destinations to which that source has sent packets. While a complete list of the IP addresses of the destinations can be kept for each packet, such a list may consume system resources and as such may not be scalable. A better way to keep such a list may be to use a compact hash table representing the set of destinations as described above. The hash table can then be used for estimating the fan-out of a node (i.e. the number of distinct sources sending traffic to a node) based on periodic sampling.

Any of the elements of the various embodiments of the process described above with reference to FIG. 6 may be implemented in any suitable combination of hardware, software, or firmware.

Figure 7:
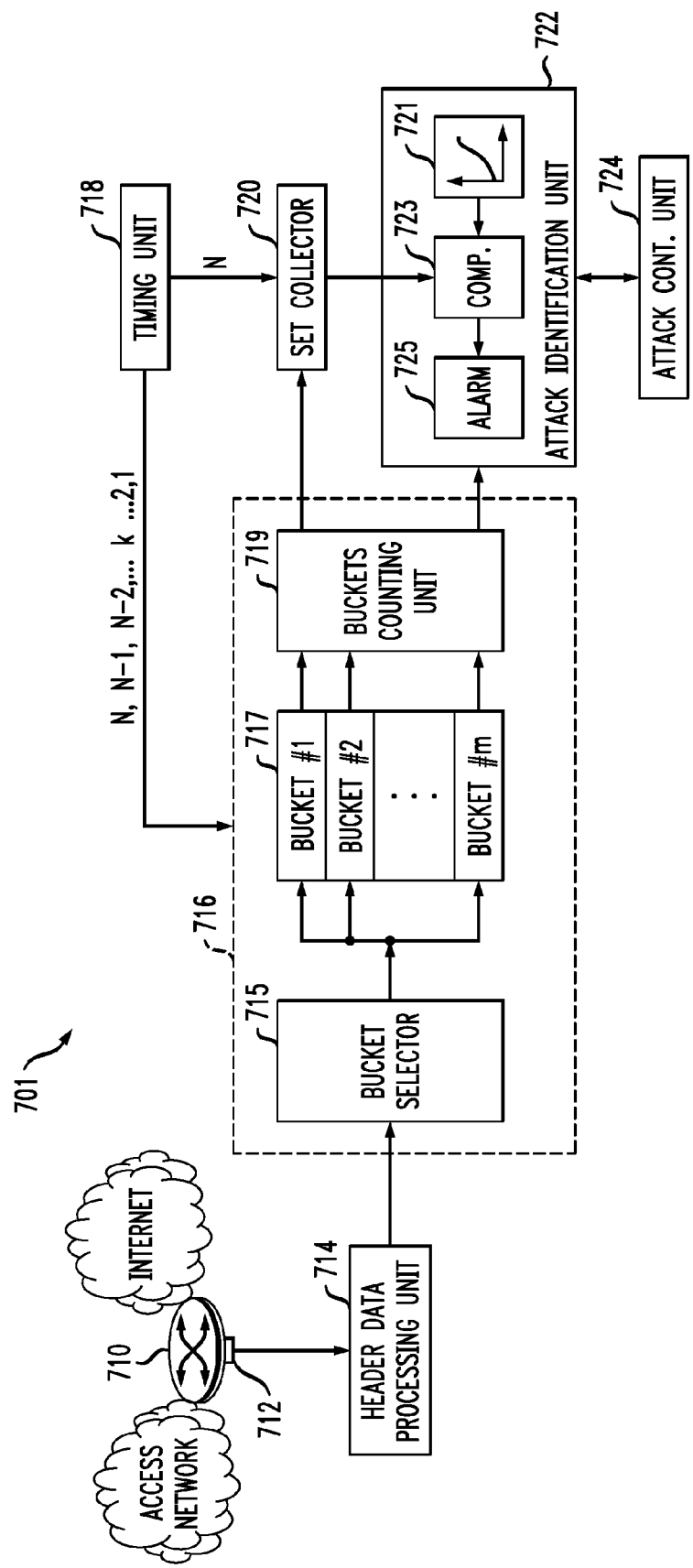
FIG. 7 is a block diagram of another exemplary embodiment of an MD system.

With reference to FIG. 7, an exemplary embodiment of a malware detection (MD) system 701 by trending fan-out includes a network element (NE) 710 with a port 712. The MD system 701 monitors the PDU's leaving port 712. The monitoring may be performed on selected ports 712 or on all ports 712 of NE 710. FIG. 7 shows only one port 712 by way of example. In this embodiment, MD system 701 includes a header data processing unit 714, a hash table unit 716, a set collector unit 720, an attack ID unit 722 and a timing unit 718. The MD system 701 may also include an attack containment unit 724.

Header data processing unit 714 monitors the PDU's seen on the port 712 and examines the data in various fields of the PDU's header with a view to determine the PDU "type" and to identify the source node, with a view to establish which hash table unit 716 should be updated. The header data processing unit 714 also extracts the IP addresses of the far-end hosts (addresses of the destinations for packets transmitted by a respective source), or IP address-port combinations. Any suitable technique for determining the type of PDU's on port 712 and for extracting the source and destination address data from the header may be implemented. Preferably the method selected for uncovering this information does not impact operation of the data path. The data extracted by the header data processing unit 714 is referred to generically as the "address data." The source address (and packet type, etc) is used to identify an appropriate hash table in the hash table unit 716, and the destination data is used, as seen later, for determining the number of far end hosts.

To detect and protect a network against slow probing worms, a time window (TW) is selected, as shown, by timing unit 718. The duration of the time window is also a design parameter, and can be selected according to the needs of the network operator. A shorter time window will allow for a quicker detection of any anomaly, but it will consume more resources and results will have less confidence. A longer time window will provide more accurate information, at a slower rate. The default for the TW parameter is expected to be in the range of a few minutes.

Hash table unit 716 is used for identifying the far-end hosts (also referred to as destination NEs) to which the respective source sends packets in each time window. While FIG. 7 illustrates a single hash table unit 716, other embodiment of MD system 701 may use multiple hash table units 716. The number of hash table units 716 is a design parameter, depending on the number of source nodes that the provider wishes to monitor, the types of the traffic to be monitored, the direction of transmission, etc. For example, port 712 may be equipped with a hash table unit 716 for each direction of traffic, and each protocol type. It is to be noted that while it is desirable to maintain distinct hash table units 716 of far-end hosts for each of the PDU categories (types) listed above, it is also possible to combine hash table units for selected protocols. For example, there may even be value in using only a single hash table unit 716 for all incoming and outgoing packets.

As discussed above, each port 712 or only some ports 712 of interest may be equipped with the MD system 701. It is not necessary to synchronize the polling for all ports 712 of the NE 710. Spreading out the polling does not impact negatively on malware detection (e.g., worm detection). Depending on the platform, one way is to integrate the polling of the hash table unit 716 (e.g., buckets count units 719) with SNMP polls, which means checking the hash table unit 716 (e.g., buckets count units 719) of a port 712 as the SNMP packets for that port 712 are processed. Also, realistically, there is no need for high precision in the polling interval, so it can be done as a low priority task.

Obviously, the usual methods of keeping track of destination nodes would run into CPU and memory limitations. Use of the hash table unit 716 results in a much faster way of counting the destination hosts seen on port 712 than keeping address lists, saves processor cycles and saves memory space at the expense of accuracy. Hash table unit 716 comprises a plurality of buckets 717, a bucket selector 715 and a buckets count unit 719. The quantity of buckets 717 used by hash table unit 716 is a design parameter and is selected based on the intended scope of malware detection (e.g., worm detection) at that particular NE 710 (e.g., node) and port 712, precision of attack detection required, resources available at the respective node/port, cost, etc. Preferably, the buckets 717 are provided in the form of a memory array of a selected size.

The point is to hash the address data from the fields of the header that identify the destination host, as generically shown by bucket selector 715. The data that is hashed by the bucket selector 715 may be referred to as "the destination address". As an example, in case of IP packets, the bits that are hashed are the IP destination address bits of the packet, or the IP destination address and port number bits.

A hash value is obtained by applying the hash function to bits in the respective header fields. The hash value is then used as an index into buckets 717 (e.g., array) for setting the bucket 717 (e.g., bit) corresponding to the respective hash value. In this way, each bucket 717 is associated with a certain set of destination host addresses because the hash function performed over the bits in the same header fields is the same if the bits are the same. Buckets count unit 719 determines which and how many buckets are set in buckets 717 (e.g., array). This set of buckets 717, denoted with X, indicates how many far-end hosts received/transmitted traffic during a time interval established by the current time window. As indicated above, TW is a design parameter, depending on the protocol of the PDUs monitored, desired accuracy of the result, etc. An attack may be, for example, detected if the number of far-end hosts is suspiciously high.

Each bucket 717 could be set repeatedly (e.g., once for each applicable PDU) or it could be set only once during the time window, using a very simple algorithm. If bucket selector 715 determines a hash value that identifies one bucket (e.g., Bucket #i) of the plurality of buckets 717 (e.g., Bucket #1 to Bucket #m), and that bucket 717 has already been seen (i.e., set), nothing happens. On the other hand, if Bucket #i has not been set, it is set. The pseudo code for bucket updating is:

```
Declare seen as Boolean[m];    set m buckets
Bucket = hash(IP, port);       hash header data to find bucket no.
If (seen[bucket]);             bucket already seen, do nothing
else;                          bucket not seen yet
    count = count + 1;
    seen[bucket] = true;
endif
```

In one exemplary embodiment, the buckets 717 were implemented on a bit array of 256 bits (m=256) and the hash function selected reduced the bit array to 8 bits. Since the IP address space is 32 bits, for an 8-bit hash, there is a choice of $2^{24}$ combinations in the same bucket 717. In other words, $2^{24}$ different combinations of address data may set the same bucket 717.

This means that an attacker could attempt to avoid detection by talking to hosts/ports that fall into the same bucket 717 in order to keep the number of far-end hosts low. Certain countermeasures may be used with a view to address this situation.

For example, the hash function used by the bucket selector 715 may be designed so that addresses in the same subnet are likely to use different buckets 717 (this is the "randomize" property that is expected from hash functions). XOR-ing the four address bytes together is another way to differentiate the sub-networks (see FIG. 4*a*). Or, it is possible to XOR the last byte of the IP address and the lower byte of the port number (see FIG. 4*b*). This will ensure that neither horizontal scanning (same port number, different IP address) nor vertical scanning (same IP address, different port) will end up in the same bucket 717. Still another solution is to add a randomizer to the hash function. Thus, a random 32 bit number may be picked at boot time and added to the IP address before doing the XOR (see FIG. 4*c*). This preserves the sub-net scattering property above and is difficult for the attacker to stay in the same bucket 717.

In general, selection of the function depends on the complexity of the attack detection desired. These methods are also described above in the paragraphs describing FIGS. 4-6. The "linear counting" of the Whang publication described and incorporated by reference above also applies to the embodiment being described.

As indicated above, the hash table unit 716 does not distinguish between destinations that hash to the same bucket 717, so the statistics are not exact. In other embodiments, any other scheme that provides such a set of destinations for the far-end hosts can be used in place of the hash table unit 716 or bucket selector 715 and plurality of buckets 717 to allow for tuning of accuracy versus resource requirements, engineering costs, etc.

To reiterate, the number X provides the number of destination NEs to which a certain source NE 710 has sent PDUs during the current time window, as determined by the number of buckets 717 that have been set during that time window. The set collector unit 720 identifies the number of destination addresses that are common over successive sets of destination addresses, from the sets of destination addresses collected including the current set of destinations, X. This number is denoted with $X_k$. In other words, $X_k$ includes the number of destination NEs common to k sets collected over k successive time windows. Once N sets of destinations (for N successive time windows) have been obtained, the set collector determines the number of destinations that are common to all N, N−1, N−2, . . . , 2, 1 of these windows. The result is a collection of nested sets, with each destination address "seen" being in the ring labeling how many windows the destination address was seen in, as in FIG. 8. The term "seen" refers in this specification to the PDUs that are transmitted from port 712 to far-end hosts (outgoing PDU's).

Figure 8:
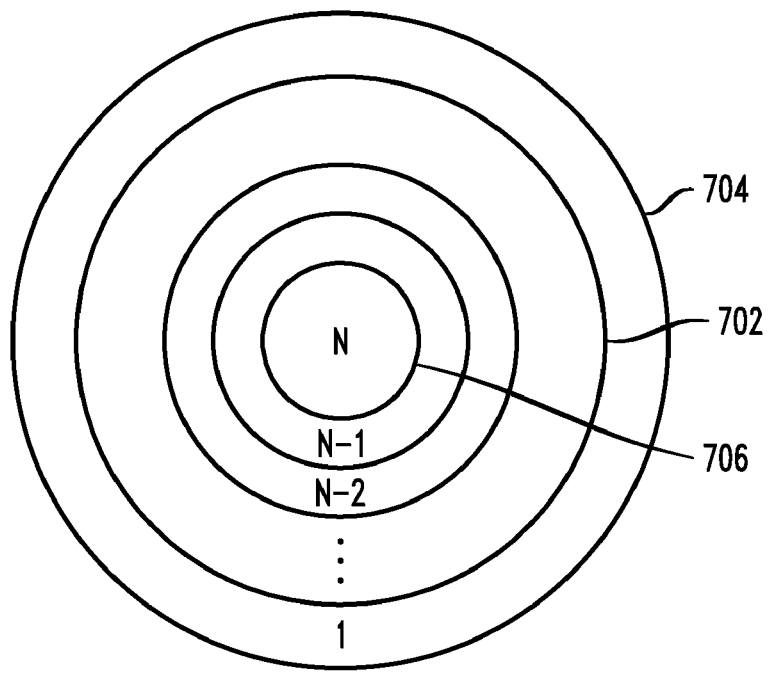
FIG. 8 shows an example of fan-out information for a collection of nested sets of destinations to which a source has sent packets in conjunction with the MD system of FIG. 7.
Figure 9:
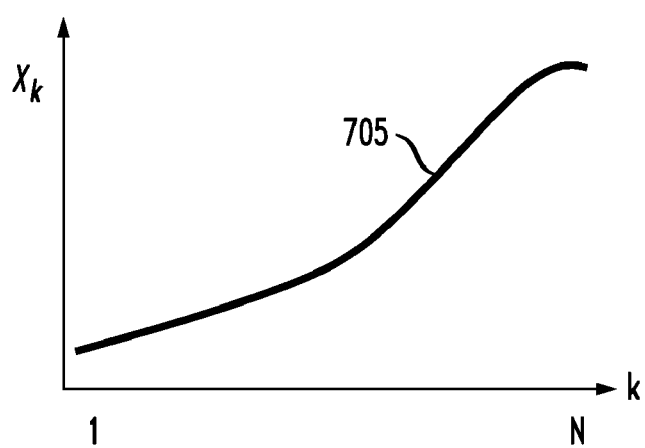
FIG. 9 shows an example of an expected fan-out pattern for a source in conjunction with the MD system of FIG. 7.

With reference to FIGS. 7-9, the attack ID unit 722 includes a memory 721 for storing a benchmark data set $A_k$ (e.g., see 705) which is prepared for the respective source based on statistical data collected over time. The graph of data set $A_k$ plots the sets $A_k$ versus the respective number of time windows k. FIG. 9 shows the graph with the number of destinations for a particular source for k=1, 2, . . . , N time windows. Generally, $A_k$ should exhibit a stable behavior for each source. This enables modeling the sources by set collector unit 720 using a specific, appropriate distributional form, with a view to minimize the amount of storage required for each source. For example, a source may be modeled using a power law graph, etc.

Attack ID unit 722 further includes a comparator 723 that compares the polled set of destination $X_k$ collected by the set collector against the corresponding value $A_k$ in the data set. Values of $X_k$ that are significantly different from the modeled graph are declared to be suspicious by an alarm logic 725. The term "significantly different" is a relative term with respect to the expected value $A_k$ in the data set, and is defined relatively to the respective benchmark plot. For example, a significantly different value may be considered an $X_k$ more than three standard deviations away from the mean value provided by a data set plot 705. Preferably, the anomalous values are also defined taking into account the time of day effects. Further, analysis of such anomalous values may be performed by the attack ID unit 722. Ideally, attack ID unit 722 should check data set plot 705 each time a hash table unit 716 is changed. While this mode of operation gives the fastest response time, it may require processing power in the data path. To avoid interference with processing for the data path, the checks may be performed at each time window TW.

Once the type of attack has been identified, attack containment unit 724 triggers a certain defensive action, based on rules provided in a rules set (e.g., see FIG. 2, item 42; FIG. 3, item 22).

From a security point of view, a relevant metric to detect malware is to determine the number of distinct sources sending traffic to a monitored destination, referred to as "node fan-in". Destinations with an abnormally large fan-in are likely to either be the target of an attack or suspected of downloading large amounts of material with a point-to-point application. This is equivalent to determining the sources with the highest fan-out (i.e., number of distinct destinations from a certain source), by interchanging the roles of source and destination; this is known as "node fan-out". Sources with an abnormally large fan-out may be attempting to spread a worm, virus, or some other type of malware.

The malware detection (MD) system collects, for each source, during a predetermined time window, denoted with T, a representation of the set of destinations to which that source has sent packets. While the destination address for each packet can be kept to obtain a complete list of the IP addresses of the destinations, such a list may consume system resources and as such may not be scalable. Another way to keep such a list is to use a compact block representing the set of destinations, as described above with reference to FIGS. 3-6. The block can then be used for estimating the fan-out of a source (i.e. the number of distinct destinations to which the source is sending packets), based on periodic sampling of the number of destinations seen at a node of the network.

Any of the elements of the various embodiments of the MD system 701 described above with reference to FIGS. 7-9 may be implemented in any suitable combination of hardware, software, or firmware.

Figure 10:
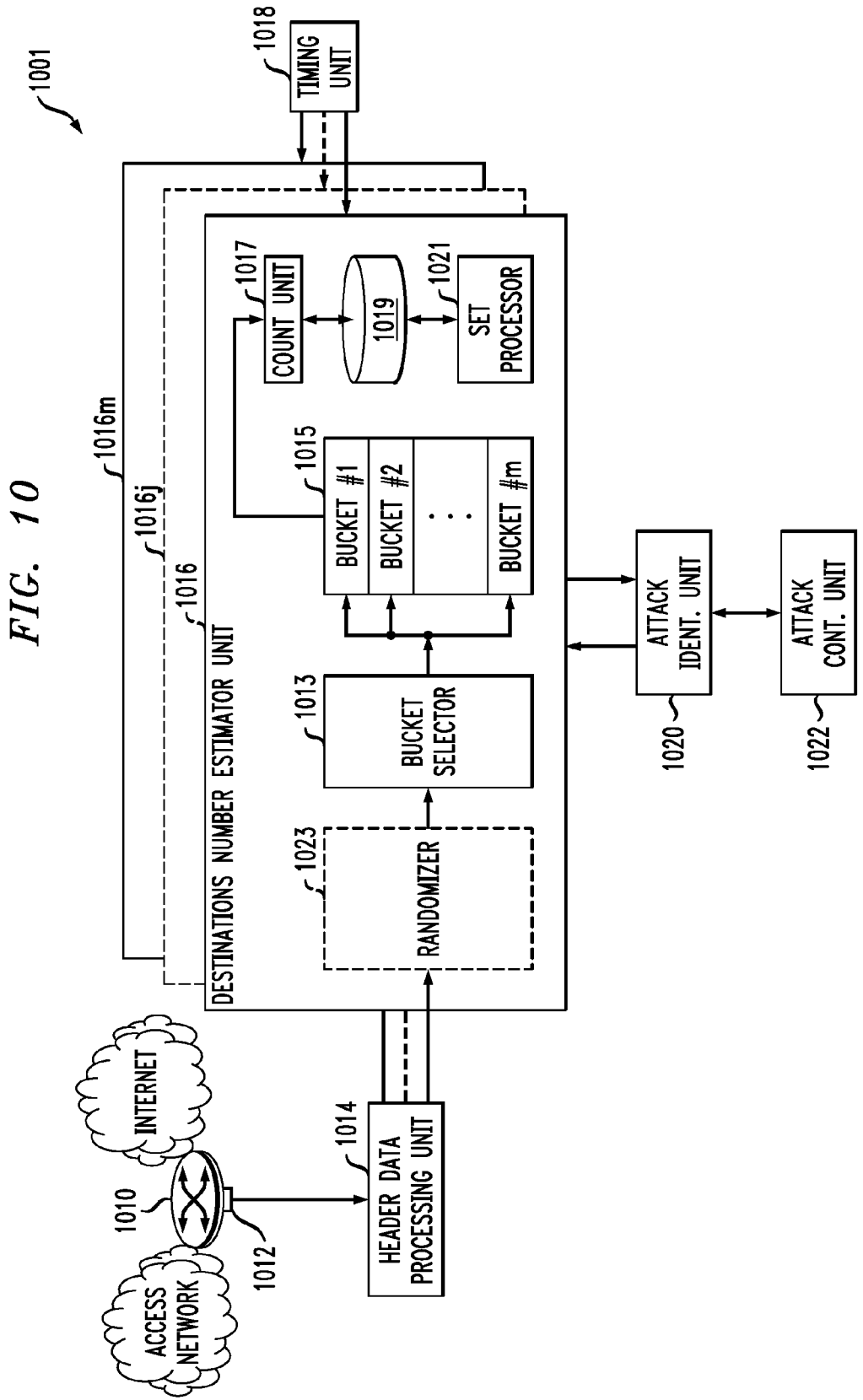
FIG. 10 is a block diagram of yet another exemplary embodiment of an MD system.

With reference to FIG. 10, an exemplary embodiment of a malware detection (MD) system 1001 for counting the new destinations seen by a network element (NE) 1010 (e.g., network node) enables malware detection (e.g., worm detection) by trending the fan-out of a node (i.e., number of distinct destinations that receive packets from a certain source). It is also to be noted that embodiments where estimation of the number of sources that send packets to a certain destination may be also used to detect malware (e.g., worms), using a similar arrangement by trending the fan-in of a node (i.e., number of distinct sources that send packets to a certain destination).

In FIG. 10, a port 1012 of NE 1010 is equipped with an MD system 1001 that monitors the packets leaving port 1012. The monitoring may be performed on selected ports 1012 or on all ports 1012 of NE 1010. FIG. 10 shows only one port 1012 by way of example. In this embodiment, the MD system 1001 includes a header data processing unit 1014, a plurality of destinations estimating units 1016 to 1016*m*, an attack ID unit 1020 and a timing unit 1018. The MD system 1001 may also include an attack containment unit 1022.

Header data processing unit 1014 monitors the packets seen on the port 1012 and examines the data in various fields of the packets header with a view to determine the packet type and to identify the source and destination of the packet. The term "packet type" refers here to the protocol used by the respective packet (e.g. IP, TCP, FR, MPEG, etc). Once the packet type is identified, the header data processing unit 1014 identifies the source of the packet and extracts destination addresses data from the packet header. Any suitable technique for determining the type of packets on port 1012 and for identifying the source address and extracting the destination address data from the header may be implemented. Preferably the method selected for uncovering this information does not impact operation of the data path.

As shown in FIG. 10, a destinations estimating unit 1016 may be maintained for each source address and packet type seen on port 1012. The source address and packet type may be used to identify the appropriate destinations estimating unit 16 to be updated for the current packet seen on port 1012. The destination address extracted by the header data processing unit is referred here as the "destination address data" or "address data". This address data may be the destination IP address, or the destination IP address and destination port number or a combination of these.

Timing unit 1018 illustrates generically selection of a time interval adopted for the time window T, over which the address data extracted from the incoming packets is processed and collected. The duration of the time window is a design parameter, selected according to the packet type, data rate on port 1012 and other design parameters. In addition, T is selected according to the needs of the network operator. Thus, a shorter time window allows for a quicker detection of any anomaly, but it will consume more resources and results will have less confidence. A longer time window will provide more accurate information, at a slower rate. The default for the T parameter is expected to be in the range of a few minutes.

Destinations estimating unit 1016 is used for identifying the destinations (also referred to as far-end hosts) to which the respective source (also referred to as the "specified source") sends packets. As seen in FIG. 10, MD system 1001 uses preferably a plurality of destinations estimating units 1016.

The quantity of units 1016 is a design parameter, depending on the quantity of sources that the provider wishes to monitor, the types of the packets to be monitored, the direction of transmission, etc. For example, port 1012 may be equipped with a destinations estimating unit 1016 for each direction of traffic and each packet type. It is to be noted that while it is desirable to maintain distinct destinations estimating units 1016 for each of the possible packet types listed above, it is also possible to combine these units for selected packet types (e.g., based on protocol, etc.). For example, there may even be value in using only a single block unit (e.g., destinations estimating unit 1016) for all incoming and outgoing packets.

Each port 1012, or only some ports 1012 of interest, on NE 1010 may be equipped with the MD system 1001 because it is not necessary to synchronize the polling for all ports 1012 of the NE 1012. Spreading out the polling does not impact negatively on malware detection (e.g., worm detection). Depending on the platform, one way is to integrate the polling of the destinations estimating units 1016 with SNMP polls, which means checking the destinations estimating units 1016 of a port 1012 as the SNMP packets for that port 1012 are processed. Also, realistically, there is no need for high precision in the polling interval, so it can be done as a low priority task.

Destinations estimating unit 1016 comprises a bucket selector 1013, a plurality of buckets 1015 (which can be a bit or a counter), a buckets count unit 1017, a set processor 1021, and a memory 1019. The bucket selector 1013 hashes the address data from the fields of the header that identify the destination host. As an example, in case of IP packets, the bits that are hashed are the IP destination address bits of the packet, or the IP destination address and port number bits. The hash value provided by bucket selector 1013 is then used as an index into the plurality of buckets 1015 (e.g., array), for setting the bucket 1015 corresponding to the respective hash value. In this way, each bucket 1015 is associated with a certain set of destination host addresses, because the hash function performed over the bits in the same header fields is the same if the bits are the same.

The quantity of buckets 1015 (e.g., array elements) is a design parameter and is selected based on the intended scope of malware detection (e.g., worm detection) at that particular node and port, precision of attack detection required, resources available at the respective node/port, cost, etc. Preferably, values for buckets 1015 are stored in the memory 1019, which could be shared by the plurality of estimating units 1016-1016*m*.

Buckets count unit 1017 determines which and how many buckets 1015 are set, for example in an array, during a current time window $T_i$. The term "current number of buckets set" refers to the number of the buckets that were set during the current time window. The set of destinations identified during the current time window, also referred to as the "current set of destinations" and denoted with X, is stored in memory 1019 along with the current number of buckets set. Thus, X indicates how many and which far-end hosts received traffic from the respective source during the current time window. An attack may be for example detected if the number of far-end hosts is suspiciously high, or in other words, if the difference between the number of new destinations counted in the current time window $T_i$ and the expected number of new destinations is greater than a threshold.

Each bucket 1015 could be set repeatedly (once for each applicable packet) or it could be set only once during the time window, using a very simple algorithm. For an MD system 1001 with m buckets 1015 (e.g., Bucket #1 to Bucket #m), if bucket selector 1013 determines a hash value that identifies one of the buckets 1015 (e.g., Bucket #i) and that bucket 1015 has already been seen (i.e., set), nothing happens. On the other hand, if Bucket #i has not been set, it is set. The pseudo code for bucket updating is:

| | |
|---|---|
| Declare seen as Boolean[m]; | set m buckets |
| Bucket = hash(IP, port); | hash header data to find bucket no. |
| If (seen[bucket]); | bucket already seen, do nothing |
| else; bucket not seen yet | |
|     count = count + 1; | |
|     seen[bucket] = true; | |
| endif | |

In one exemplary embodiment, the buckets 1015 for a certain source were implemented on a bit array of 8 bits. Since the IP address space is 32 bits, for an 8-bit hash, there is a choice of $2^{24}$ combinations in the same bucket 1015. In other words, $2^{24}$ different combinations of address data may set the same bucket 1015. This means that an attacker could attempt to avoid detection by talking to hosts/ports that fall into the same bucket 1015 in order to keep the number of far-end hosts low. However, such an action requires knowledge of the hash function used for the bucket selector 1013. Certain countermeasures may be used with a view to address this situation. For example, the hash function used by the bucket selector 1013 may be designed so that addresses in the same subnet would likely use different buckets 1015.

In general, selection of the hash function depends on the complexity of the attack detection desired. There many possible implementations for hashing the address data, one way is to use the "linear counting" of the Whang publication described and incorporated by reference above which also applies to the embodiment being described. The Whang publication presents a thorough mathematical treatment of these, counting techniques.

In addition, further randomizing of the bucket selection (i.e., beyond hashing the address data) may be achieved using various arrangements shown generically by a randomizer 1023. Randomizer 1023 may have various embodiments. It may, for example, operate by XOR-ing the four address bytes together (see FIG. 4a), which is another way to differentiate the sub-networks. Or, it is possible to XOR the last byte of the IP address and the lower byte of the port number (see FIG. 4b). This will ensure that neither horizontal scanning (same port number, different IP address) nor vertical scanning (same IP address, different port) will end up in the same bucket 1015. Also, a random number (e.g. a 32 bit number) may be picked at boot time and added to the address data before doing the XOR (see FIG. 4c). This preserves the sub-net scattering property above making it difficult for the attacker to stay in the same bucket 1015.

As indicated above, the bucket selector 1013 does not distinguish between destinations that hash to the same bucket 1015, so the statistics are not exact. In other embodiments, any other scheme that provides such a set of destinations for far-end hosts can be used in place of the bucket selector 1013 and plurality of buckets 1015 to allow for tuning of accuracy versus resource requirements, engineering costs, etc. Also, the information obtained by hashing address data may be collected using other methods. The point is to keep in memory 1019 sets of destination (IP) addresses for each source over the successive time windows. While each set may not be complete, it provides a good estimate of the destinations to which a source sends packets, without consuming a lot of memory and processing power at the node.

One characteristic of the way the data is collected is that OR'ing two sets produces a "block" that is equivalent to counting the combined set. This may be used by the set processor 1021 for determining when new destinations appear in a table. At the end of each time window, the set processor 1021 may prepare a "cumulative table" $C_i$ with the destination addresses identified and counted over predetermined period of time $T_i$-$T_0$, (including i time windows). The predetermined period of time is measured in successive time windows. Set processor 1021 prepares the cumulative table by OR'ing successive sets of destinations obtained over successive time windows. Each $C_i$ is exactly the set of destinations that has been seen from time 0 to time i.

Destinations estimating unit 1021 then calculates how many new destinations are present in the current time window $T_i$, by comparing $C_i$ to $C_{i-1}$. The typical pattern for the respective source is also recorded in memory 1019. This data indicates how many new destinations are normally introduced in the normal traffic throughout comparable time intervals. Any change between the quantity of new destinations from the typical pattern, such as a regular introduction of new destinations can be suspected as being caused by, for example, a slow scanning worm. Such abnormal behavior is identified by attack ID unit 1020.

FIG. 10 shows generically attack ID unit 1020 and attack containment unit 1022; it is to be noted that identification and containment of any malware attack (e.g., worm attack) may be performed by any method available to the network provider, can be effected locally at the node, or by a network management system, etc. It is also to be noted that the attack ID unit 20 and attack containment unit 22 may be provided on a separate workstation or as part of a network management system.

It is desirable to combine the malware detection method for the embodiment being described with other techniques to virtually eliminate false positives. For example, it can be combined with methods of tracking DNS look ups and SYN connection attempts because if a failed connection attempt is to a new destination that did not come from DNS look up, it may be caused by a scan probe. This can be easily accomplished, for example, as indicated above, using several destination estimating units 1016 for each event and correlating appropriately the results obtained from these destination estimating units 1016.

Any of the elements of the various embodiments of the MD system 1001 described above with reference to FIG. 10 may be implemented in any suitable combination of hardware, software, or firmware.

With reference to FIG. 2, the malware ID logic 44 operates to compare one or more of the count values to at least one of the preset limits in the limits table 41 and may also perform mathematical computations using two or more count values to derive a result and compare the result to a further limit from the limits table 41. In processing each PDU 17, once the counters 25 are updated, the attack ID logic 43 checks the count values against the limits table 41, according to the following simple counter value comparison tests to identify suspected malware activity: i) If countSYN>100 (e.g., this catches malware (e.g., worms) trying to connect to many hosts); ii) If countUDPout>100 (e.g., this catches malware (e.g., worms) trying to connect to many hosts with UDP); and iii) If countARP>100 (e.g., this catches malware (e.g., worms) probing the local sub-net).

Another exemplary embodiment of the malware ID logic 44 may also perform the following mathematical computations and result comparisons: i) If (countSYN−countSYN-ACK)/countSYN>0.15 (e.g., this catches low percentage completion of TCP); ii) If (countUDPout−countUDPin)/countUDPout>0.15 (e.g., this catches low percentage completion of UDP); iii) If (countRST+countICMPnonreachable)>25 (e.g., this catches many far-ends that refuse to talk or are unreachable); and iv) If ((countSYNhosts>50) and (countSYN−countSYNACK>30)) (e.g., this catches malware (e.g., worms) trying to connect to many hosts and only getting through to some).

As noted above, these are merely examples, and any number of comparisons, computations, threshold limit values, etc., may be employed in the malware detection logic 20 on a MAC address basis using the determined PDU types. Moreover, any of these parameters may be modified by a network operator.

In addition, if a PDU 17 causes a rule to trigger by such comparisons, there can be a number of actions taken via the attack containment logic 46. In one example, the suspected MAC address 31 can be totally blocked, for example, by dropping all packets from the MAC address 31 (e.g., until manually reset). This is preferably used for rules that have very low false-positive. Alternatively, the suspect MAC address 31 can be quarantined to a VLAN that is dedicated to remediation only where virus scanners and other tools can be brought to bear or the attack containment logic 46 may quarantine the MAC address 31 to a honey pot VLAN so that the malware (e.g., worm) can be observed in action. Another exemplary remedy includes temporarily blocking the MAC address 31, such as for one second, then for two seconds, then for four seconds, doubling each time, which may be advantageous for rules that have fuzzy boundaries when legitimate users may occasionally exceed the limit. This action only slows down the user at the limits, but eventually blocks the user totally if the client device 30 is indeed infected. Moreover, since the malware detection logic 20 is in the "fast" path at the access switch 14, action can be taken quickly, including dropping the PDU 17 that triggered the action.

As an example of possible attack detection, assuming a TCP flash worm scans a local sub-net by MAC address 31, a large number of ARP request PDUs 17 will be scrutinized by the malware detection logic 20, with a smaller number of ARP response PDUs, indicating that the malware is attempting to spread. The ARP PDUs 17 that succeed will be followed by SYN PDUs 17 trying to establish connections. This kind of worm will be caught by any of the following comparisons and trigger conditions, noting that the limit values can be set to other values than those below in different applications: i) If countARP>100; ii) If countSYN>100; iii) If (countSYN countSYNACK)/countSYN>0.15; or iv) If countSYNhosts>100. A UDP flash worm will be detected on similar conditions.

A SYN flood attack originating from a client device 30 or other "high intensity" attack can be detected by the malware detection logic 20 by the countSYN limit value, and even "low intensity" attacks will be detectable using a comparison of a (countSYN−countSYNACK)/countSYN" rule 42. In another example, a targeted worm (e.g., one that does not blindly scan addresses, but uses a pre-known list of Mac addresses 31) can be detected by any of the following comparisons/computations: i) If countARP>100; ii) If countSYN>100; iii) If (countSYN−countSYNACK)/countSYN>0.15; iv) If countSYNhosts>100, or iv) If countNameLookup>100.

Compared with port-based solutions, the embodiment being described can isolate worms and other malware to a specific client device 30, particularly in combination with some form of anti-spoofing. This approach thus avoids the complicated processing of other solutions, provides a means to track the number of far-end hosts and is thus resistant to attackers being able to manipulate detection using pre-knowledge of a particular detection algorithm, provides a combined detection/action plan that gets early alerts without the problems of false-positive alerts, and provides the ability to manage/set limits for individual client devices 30.

Figure 11:
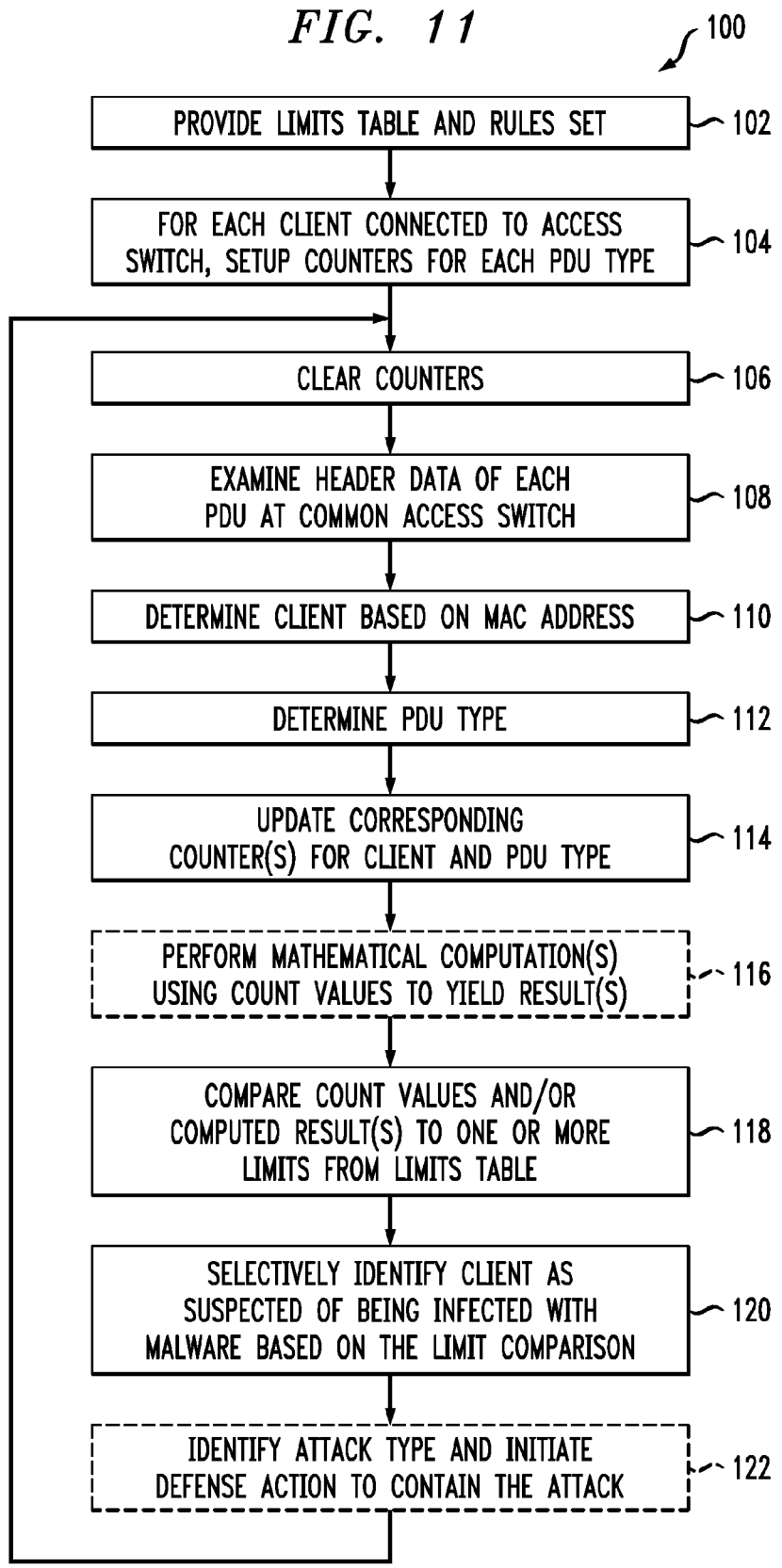
FIG. 11 is a flow chart of an exemplary embodiment of a process for malware detection.

Referring now to FIGS. 11 and 2, an exemplary embodiment of a process 100 for detecting malware for client users 30 sharing a common access switch 14 in a wireless LAN 10 is illustrated in the form of a series of acts or events. However, it will be appreciated that the various methods of the disclosure are not limited by the illustrated ordering of such acts or events. In this regard, except as specifically provided hereinafter, some acts or events may occur in different order and/or concurrently with other acts or events apart from those illustrated and described herein in accordance with the disclosure. It is further noted that not all illustrated steps may be required to implement a process or method in accordance with the present disclosure, and one or more such acts may be combined. The illustrated embodiment and other embodiments of the disclosure may be implemented in hardware, software, or combinations thereof, in order to provide the malware detection aspects illustrated and described herein.

The process 100 begins at 102 with provision of a limits table 41 and the set of rules 42. Counters 25 are set up at 104 for each client device 30 (e.g., each MAC address 31) connected to the access switch 14 and for each PDU type, and the counters 25 are cleared at 106. At 108, the header data of protocol data units (PDUs) at the common access switch 14 are examined and, based on this, the client device 30 and PDU type are determined at 110 and 112, respectively. The counters 25 corresponding to the determined client device 30 and PDU type are updated at 114 and mathematical computations are optionally performed at 116 to compute results. Comparisons are then made at 118 of the count values/results with limits from the limits table 41. At 120, client devices 30 are selectively identified that are suspected of being infected with malware based at least in part on the count values, the limits table 41, and the rules 42. The process 100 may optionally include identifying a type of attack (e.g., based on the count values, the limits table 41, and the rules 42) and initiating a defense action for containing the identified attack type at 122. This process repeats with the counters being cleared again at the end of each sample period.

Any of the elements of the various embodiments of the process 100 described above with reference to FIG. 11 may be implemented in any suitable combination of hardware, software, or firmware. Likewise, any of the elements of the various embodiments of the wireless LAN 10 described above with reference to FIG. 2 may be implemented in any suitable combination of hardware, software, or firmware.

Figure 12:
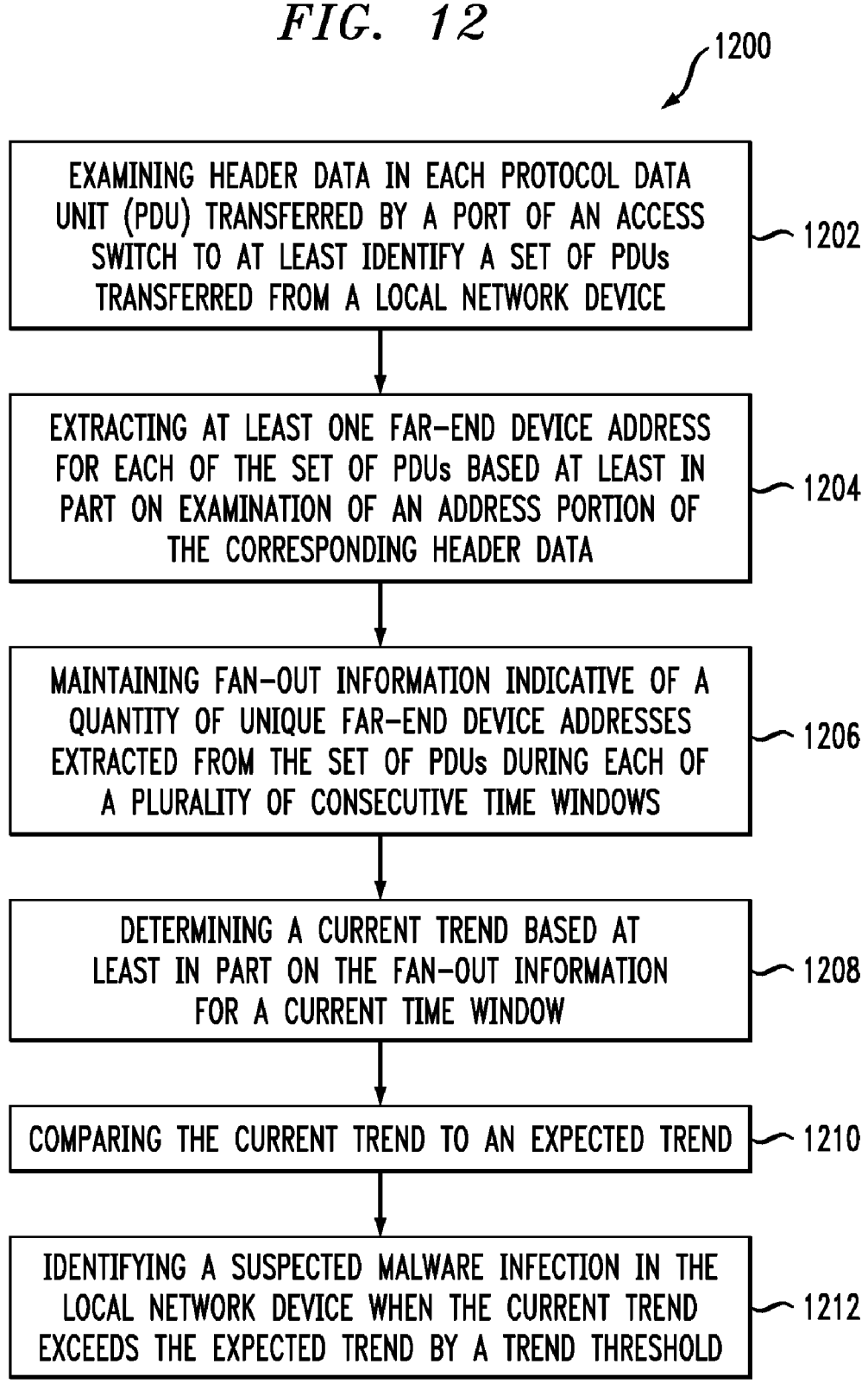
FIG. 12 is a flow chart of another exemplary embodiment of a process for malware detection.

With reference to FIG. 12, an exemplary embodiment of a process 1200 for detecting malware may begin at 1202 where header data in each protocol data unit (PDU) transferred by a port of an access switch may be examined to at least identify a set of PDUs transferred from a local network device. Next, at least one far-end device address for each PDU of the set of PDUs may be extracted based at least in part on examination of an address portion of the corresponding header data (1204). At 1206, fan-out information indicative of a quantity of unique far-end device addresses extracted from the set of PDUs during each of a plurality of consecutive time windows may be maintained. Next, a current trend may be determined based at least in part on the fan-out information for a current time window (1208). At 1210, the current trend may be compared to an expected trend. Next, a suspected malware infection in the local network device may be identified when the current trend exceeds the expected trend by a trend threshold.

In another embodiment, the process 1200 may also include transferring PDUs from a plurality of local network devices via the port of the access switch. In still another embodiment, the process 1200 may also include identifying the set of PDUs based at least in part on identification of a globally unique identifier associated with the local network device in the address portion of the corresponding header data. In this embodiment, the globally unique identifier in the address portion of the header data may relate to a media access control (MAC) address for the local network device.

In another embodiment, each far-end device address extracted in 1204 may be processed using a hash function to obtain a corresponding hash value. Next, if a corresponding bit of a bit array indexed to the obtained hash value is not set, the corresponding bit is set. Then, set bits of the bit array may be counted during the current time window to obtain the fan-out information.

In still another embodiment, the current trend may be determined by comparing the fan-out information from consecutive time windows. In an alternative embodiment, the current trend may be determined by comparing the fan-out information for the current time window to a corresponding time window of an expected fan-out pattern. In this embodiment, a benchmark data set for expected transmission of PDUs from the local network device in relation to a time parameter may be provided. For example, the expected fan-out pattern may be based at least in part on the benchmark data set.

In yet another embodiment, actions to contain the suspected malware infection to the local network device may be initiated. In this embodiment, at least one of a group of containment actions may be performed, such as: i) blocking PDUs from the local network device pending manual intervention, ii) quarantining PDUs from the local network device to a virtual local area network (VLAN), and iii) blocking PDUs from the local network device for a predetermined time, increasing the predetermined time each time a suspected malware infection is identified, until malware infections are suspected in the local network device a predetermined quantity of times, upon which PDUs from the local network device are blocked pending manual intervention.

Any of the elements of the various embodiments of the process 1200 described above with reference to FIG. 12 may be implemented in any suitable combination of hardware, software, or firmware.

Figure 13:
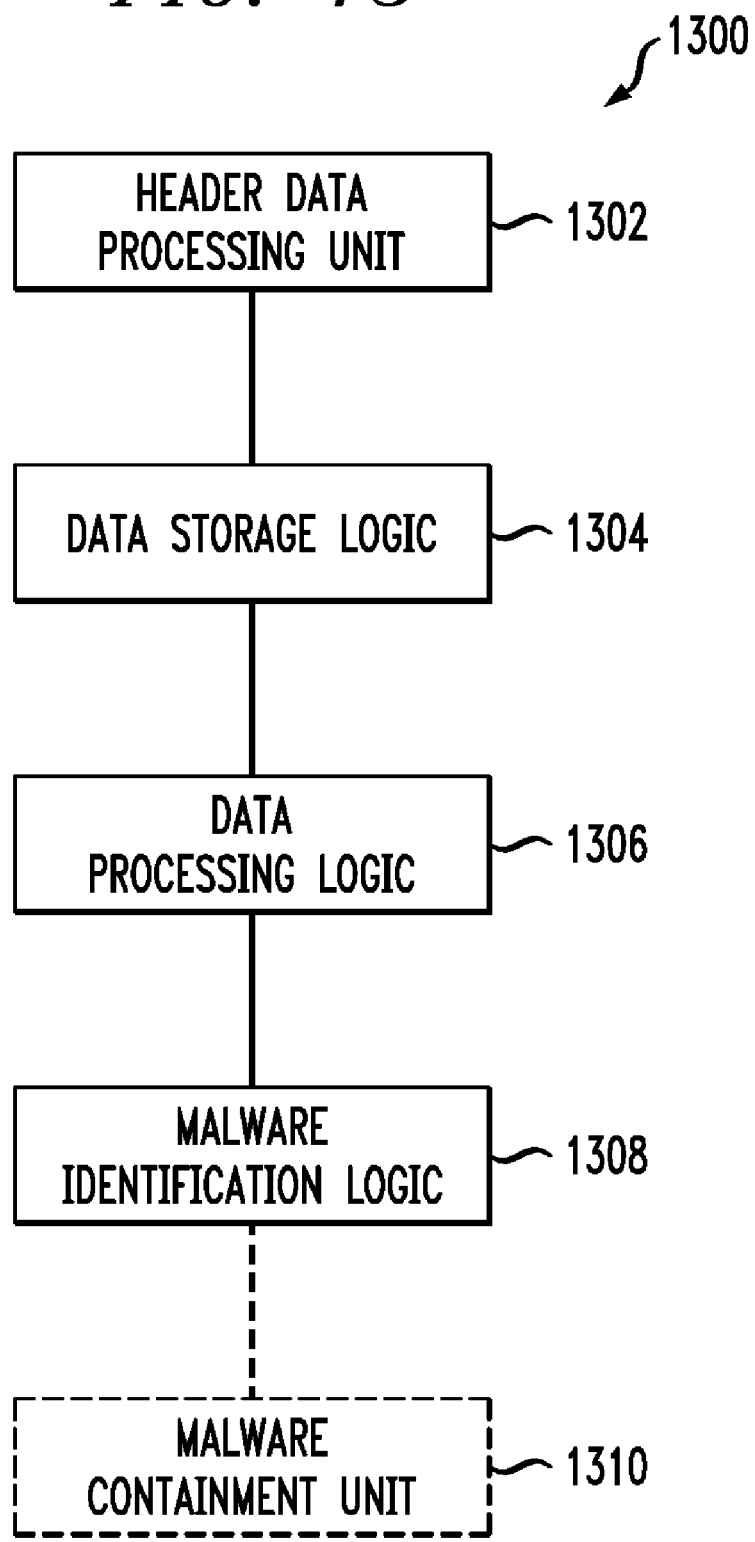
FIG. 13 is a block diagram of a an exemplary embodiment of a network element (NE) for malware detection.

With reference to FIG. 13, a network element (NE) 1300 for detecting malware may include a header data processing unit 1302, a data storage logic 1304 in operative communication with the header data processing unit 1302, a data processing logic 1306 in operative communication with the data storage logic 1304, and a malware identification logic 1308 in operative communication with the data processing logic 1306. The NE 1300, for example, may be implemented within an access switch 14 (FIG. 1) of a wireless LAN 10 (FIG. 1) or another type of communication network.

With continued reference to FIG. 13, The header data processing unit 1302 may examine header data in each protocol data unit (PDU) transferred by a port 15 (FIG. 2) of an access switch 14 (FIG. 2) to at least identify a set of PDUs transferred from a local network device 30 (FIG. 2). The header data processing unit 1302 may also extract at least one far-end device address for each of the set of PDUs based at least in part on examination of an address portion of the corresponding header data. The data storage logic 1304 may maintain fan-out information indicative of a quantity of unique far-end device addresses extracted from the set of PDUs during each of a plurality of consecutive time windows. The data processing logic 1306 may determine a current trend based at least in part on the fan-out information for a current time window. The data processing logic 1306 may also compare the current trend to an expected trend. The malware identification logic 1308 may identify a suspected malware infection in the local network device 30 (FIG. 2) when the current trend exceeds the expected trend by a trend threshold.

In another embodiment, the port 15 (FIG. 2) of the access switch 14 (FIG. 2) may transfer PDUs from a plurality of local network devices 30 (FIG. 2). In still another embodiment, the header data processing unit 1302 may identify the set of PDUs based at least in part on identification of a globally unique identifier associated with the local network device 30 (FIG. 2) in the address portion of the corresponding header data. In this embodiment, the globally unique identifier in the address portion of the header data may relate to a media access control (MAC) address 31 (FIG. 2) for the local network device 30 (FIG. 2).

In still another embodiment, during each time window, the data storage logic 1304 may process each far-end device address extracted by the header data processing unit 1302 using a hash function to obtain a corresponding hash value. The data storage logic 1304 may also ensure a corresponding bit of a bit array indexed to the obtained hash value is set. In this embodiment, the data storage logic 1304 may count set bits of the bit array during the current time window to obtain the fan-out information.

In yet another embodiment, the data processing logic 1306 may determine the current trend by comparing the fan-out information from consecutive time windows. In an alternate embodiment, the data processing logic 1306 may determine the current trend by comparing the fan-out information for the current time window to a corresponding time window of an expected fan-out pattern.

In still yet another embodiment, the NE 1300 may also include a malware containment unit 1310 in operative communication with the malware identification logic 1308. The malware containment unit 1310 may initiate actions to contain the suspected malware infection to the local network device.

Any of the elements of the various embodiments of the NE 1300 described above with reference to FIG. 13 may be implemented in any suitable combination of hardware, software, or firmware.

Figure 14:
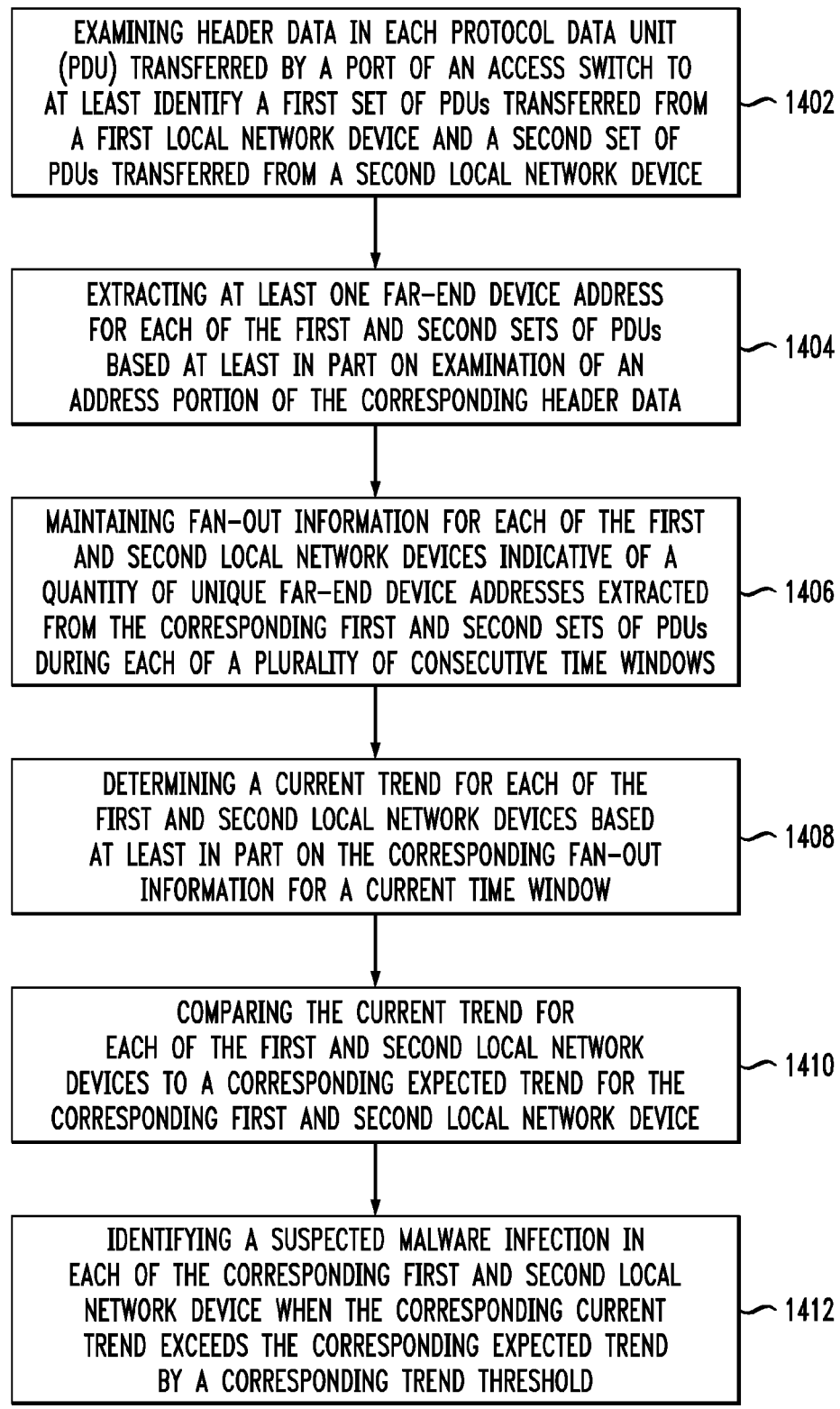
FIG. 14 is a flow chart of yet another exemplary embodiment of a process for malware detection.

With reference to FIG. 14, a process 1400 for detecting malware may begin at 1402 where header data in each protocol data unit (PDU) transferred by a port of an access switch may be examined to at least identify a first set of PDUs transferred from a first local network device and a second set of PDUs transferred from a second local network device. Next, at least one far-end device address may be extracted for each PDU of the first and second sets of PDUs based at least in part on examination of an address portion of the corresponding header data (1404). At 1406, fan-out information for each of the first and second local network devices indicative of a quantity of unique far-end device addresses extracted from the corresponding first and second sets of PDUs during each of a plurality of consecutive time windows may be maintained. Next, a current trend for each of the first and second local network devices may be determined based at least in part on the corresponding fan-out information for a current time window (1408). At 1410, the current trend for each of the first and second local network devices may be compared to a corresponding expected trend for the corresponding first and second local network device. Next, a suspected malware infection in each of the corresponding first and second local network devices may be identified when the corresponding current trend exceeds the corresponding expected trend by a corresponding trend threshold.

In another embodiment, the process 1400 may also including initiating actions to contain the suspected malware infection to each corresponding local network device, including: i) at least partially blocking PDUs from the local network device pending manual intervention or ii) quarantining PDUs from the local network device to a virtual local area network (VLAN).

Any of the elements of the various embodiments of the process 1400 described above with reference to FIG. 14 may be implemented in any suitable combination of hardware, software, or firmware.

Various aspects of the disclosure are illustrated and described in terms of software, or algorithms, and/or symbolic representations of operations on data bits within a computer memory, by which ordinary skilled artisans convey the substance of their work. As such, algorithms, scripts, computations, and other operations of the described components may be implemented as computer implemented steps via programmed software code or other programming or configuration to provide a desired result, where such steps involve manipulation or transformation of physical quantities such as stored memory states in a computer memory.

In particular, certain embodiments may include software components operating according to programmed computer-executable instructions stored in an electronic memory, which operate on data and packets (e.g., PDUs 17) sent to or received from, for example, wireless LANs 10, core networks 6, or the Internet 8. This data may be likewise stored in an electronic memory, at least for a time, wherein the packets and data described herein may be of any suitable form including without limitation optical, electrical, or magnetic signals capable of being stored, transferred, combined, compared, and otherwise manipulated, and wherein these may be referred to in various terms such as bits, values, elements, symbols, characters, terms, numbers, etc. In this regard, unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

In addition, the various software implemented aspects of the present disclosure are typically encoded on some form of program storage medium or implemented over some type of transmission medium. The program storage medium may be magnetic (e.g., a floppy disk or a hard drive) or optical (e.g., a compact disk read only memory (CD ROM) or read/writable optical disk), and may be read only or random access. Similarly, the transmission medium may be twisted wire pairs, coaxial cable, optical fiber, or some other suitable transmission medium known to the art. The disclosure is not limited by these aspects of any given implementation.

Although the invention has been illustrated and described with respect to one or more exemplary implementations or embodiments, equivalent alterations and modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary implementations of the invention. In addition, although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising".

The above description merely provides a disclosure of particular embodiments of the invention and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of detecting malware, comprising:
a) examining header data in each protocol data unit (PDU) transferred by a port of an access switch to at least identify a set of PDUs transferred from a local network device;
b) extracting at least one far-end device address for each PDU of the set of PDUs based at least in part on examination of an address portion of the corresponding header data;
c) maintaining fan-out information indicative of a quantity of unique far-end device addresses extracted from the set of PDUs during each of a plurality of consecutive time windows;
d) determining a current trend based at least in part on the fan-out information for a current time window;
e) comparing the current trend to an expected trend; and
f) identifying a suspected malware infection in the local network device when the current trend exceeds the expected trend by a trend threshold.

2. The method of claim 1, further comprising:
g) transferring PDUs from a plurality of local network devices via the port of the access switch.

3. The method of claim 1, further including:
g) identifying the set of PDUs based at least in part on identification of a globally unique identifier associated with the local network device in the address portion of the corresponding header data.

4. The method of claim 3 wherein the globally unique identifier in the address portion of the header data relates to a media access control (MAC) address for the local network device.

5. The method of claim 1, during each time window, further comprising:
g) processing each far-end device address extracted in b) using a hash function to obtain a corresponding hash value;
h) ensuring a corresponding bit of a bit array indexed to the obtained hash value is set; and
i) counting set bits of the bit array during the current time window to obtain the fan-out information.

6. The method of claim 1, further comprising:
g) determining the current trend by comparing the fan-out information from consecutive time windows.

7. The method of claim 1, further comprising:
g) determining the current trend by comparing the fan-out information for the current time window to a corresponding time window of an expected fan-out pattern.

8. The method of claim 7, further comprising:
h) providing a benchmark data set for expected transmission of PDUs from the local network device in relation to a time parameter, wherein the expected fan-out pattern is based at least in part on the benchmark data set.

9. The method of claim 1, further comprising:
g) initiating actions to contain the suspected malware infection to the local network device.

10. The method of claim 9, further comprising:
h) performing at least one of a group of containment actions, including: i) blocking PDUs from the local network device pending manual intervention, ii) quarantining PDUs from the local network device to a virtual local area network (VLAN), and iii) blocking PDUs from the local network device for a predetermined time, increasing the predetermined time each time a suspected malware infection is identified, until malware infections are suspected in the local network device a predetermined quantity of times, upon which PDUs from the local network device are blocked pending manual intervention.

11. An apparatus for detecting malware, comprising:
a header data processing unit to examine header data in each protocol data unit (PDU) transferred by a port of an access switch to at least identify a set of PDUs transferred from a local network device and to extract at least one far-end device address for each of the set of PDUs based at least in part on examination of an address portion of the corresponding header data;
a data storage logic in operative communication with the header data processing unit to maintain fan-out information indicative of a quantity of unique far-end device addresses extracted from the set of PDUs during each of a plurality of consecutive time windows;
a data processing logic in operative communication with the data storage logic to determine a current trend based at least in part on the fan-out information for a current time window and to compare the current trend to an expected trend; and
a malware identification logic in operative communication with the data processing logic to identify a suspected malware infection in the local network device when the current trend exceeds the expected trend by a trend threshold.

12. The apparatus of claim 11 wherein the port of the access switch transfers PDUs from a plurality of local network devices.

13. The apparatus of claim 11 wherein the header data processing unit identifies the set of PDUs based at least in part on identification of a globally unique identifier associated with the local network device in the address portion of the corresponding header data.

14. The apparatus of claim 13 wherein the globally unique identifier in the address portion of the header data relates to a media access control (MAC) address for the local network device.

15. The apparatus of claim 11 wherein, during each time window, the data storage logic processes each far-end device address extracted by the header data processing unit using a hash function to obtain a corresponding hash value, ensures a corresponding bit of a bit array indexed to the obtained hash value is set; and counts set bits of the bit array during the current time window to obtain the fan-out information.

16. The apparatus of claim 11 wherein the data processing logic determines the current trend by comparing the fan-out information from consecutive time windows.

17. The apparatus of claim 11 wherein the data processing logic determines the current trend by comparing the fan-out information for the current time window to a corresponding time window of an expected fan-out pattern.

18. The apparatus of claim 11, further comprising:
a malware containment unit in operative communication with the malware identification logic to initiate actions to contain the suspected malware infection to the local network device.

19. A method of detecting malware, comprising:
a) examining header data in each protocol data unit (PDU) transferred by a port of an access switch to at least identify a first set of PDUs transferred from a first local network device and a second set of PDUs transferred from a second local network device;
b) extracting at least one far-end device address for each PDU of the first and second sets of PDUs based at least in part on examination of an address portion of the corresponding header data;
c) maintaining fan-out information for each of the first and second local network devices indicative of a quantity of unique far-end device addresses extracted from the corresponding first and second sets of PDUs during each of a plurality of consecutive time windows;
d) determining a current trend for each of the first and second local network devices based at least in part on the corresponding fan-out information for a current time window;
e) comparing the current trend for each of the first and second local network devices to a corresponding expected trend for the corresponding first and second local network device; and
f) identifying a suspected malware infection in each of the corresponding first and second local network device when the corresponding current trend exceeds the corresponding expected trend by a corresponding trend threshold.

20. The method of claim 19, further comprising:
g) initiating actions to contain the suspected malware infection to each corresponding local network device, including: i) at least partially blocking PDUs from the local network device pending manual intervention or ii) quarantining PDUs from the local network device to a virtual local area network (VLAN).

* * * * *